US012475814B2

(12) United States Patent
Nakashima et al.

(10) Patent No.: US 12,475,814 B2
(45) Date of Patent: Nov. 18, 2025

(54) MEDIUM INCLUDING RELEASE MATERIAL, SLIT, AND PRINT LABEL AND METHOD OF WRAPPING THE SAME

(71) Applicant: BROTHER KOGYO KABUSHIKI KAISHA, Nagoya (JP)

(72) Inventors: Chie Nakashima, Nagoya (JP); Yuki Hokari, Nagoya (JP); Takaaki Banno, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 1124 days.

(21) Appl. No.: 17/213,565

(22) Filed: Mar. 26, 2021

(65) Prior Publication Data

US 2021/0217329 A1 Jul. 15, 2021

Related U.S. Application Data

(63) Continuation-in-part of application No. PCT/JP2019/033465, filed on Aug. 27, 2019.

(30) Foreign Application Priority Data

Sep. 28, 2018 (JP) ................................ 2018-184809

(51) Int. Cl.
*G09F 3/10* (2006.01)
*G09F 3/00* (2006.01)
(Continued)

(52) U.S. Cl.
CPC ............. *G09F 3/10* (2013.01); *G09F 3/0295* (2013.01); *G09F 2003/023* (2013.01); *H02G 1/06* (2013.01)

(58) Field of Classification Search
CPC .... G09F 3/10; G09F 3/0295; G09F 2003/023; G09F 3/205; G09F 2003/0201; G09F 2003/0202; H02G 1/06
See application file for complete search history.

(56) References Cited

U.S. PATENT DOCUMENTS 4,317,852 A 3/1982 Ogden
5,103,583 A * 4/1992 VanErmen ............... G09F 3/02 283/81

(Continued)

FOREIGN PATENT DOCUMENTS

CN 1541382 A 10/2004
CN 101987533 A 3/2011

(Continued)

OTHER PUBLICATIONS

Chinese Office Action for the related Chinese Patent Application No. 201980064009.X dated Feb. 14, 2023.

(Continued)

*Primary Examiner* — Patricia L. Nordmeyer
(74) *Attorney, Agent, or Firm* — KENEALY VAIDYA LLP

(57) ABSTRACT

A medium to be mounted in and to be printed with a printer includes: a release material; a slit; and a print label. The release material is opaque. The slit is provided in the release material and has a square shape including a first side, a second side, a third side, and a fourth side. The first side and the second side oppose each other. The third side and the fourth side oppose each other. The print label is fixed to the release material so as to span across the first side of the slit.

18 Claims, 28 Drawing Sheets

(51) Int. Cl.
*G09F 3/02* (2006.01)
*H02G 1/06* (2006.01)

(56) References Cited

U.S. PATENT DOCUMENTS

| | | | | | |
|---|---|---|---|---|---|
| 5,484,168 | A * | 1/1996 | Chigot | G09F 3/0288 283/67 |
| 5,658,648 | A | 8/1997 | Doerr et al. | |
| 5,708,462 | A | 1/1998 | Helmbold et al. | |
| 5,720,499 | A * | 2/1998 | Sakashita | G09F 3/10 283/105 |
| 5,958,536 | A | 9/1999 | Gelsinger et al. | |
| 6,177,163 | B1 * | 1/2001 | Blok | G09F 3/10 156/277 |
| 7,588,811 | B2 | 9/2009 | Blank et al. | |
| 8,507,065 | B2 | 8/2013 | Milson | |
| 2004/0026024 | A1 | 2/2004 | Nakasaka et al. | |
| 2004/0226467 | A1 | 11/2004 | Underwood et al. | |
| 2009/0167013 | A1 | 7/2009 | Horikoshi | |
| 2009/0277570 | A1 | 11/2009 | Caveney et al. | |
| 2010/0127491 | A1 | 5/2010 | Scholl et al. | |
| 2011/0239507 | A1 | 10/2011 | Wanibuchi | |
| 2014/0152753 | A1 | 6/2014 | Moriyama et al. | |
| 2018/0015748 | A1 | 1/2018 | Kato et al. | |
| 2018/0015749 | A1 | 1/2018 | Inoue et al. | |

FOREIGN PATENT DOCUMENTS

| | | | | |
|---|---|---|---|---|
| CN | 102099845 | A | 6/2011 | |
| CN | 102233757 | A | 11/2011 | |
| CN | 107709023 | A | 2/2018 | |
| CN | 107851404 | A | 3/2018 | |
| EP | 0431825 | A2 * | 6/1991 | G09F 3/0286 |
| EP | 2283477 | A1 | 2/2011 | |
| EP | 2581897 | A1 | 4/2013 | |
| EP | 2979877 | A1 | 2/2016 | |
| EP | 3933813 | A1 | 1/2022 | |
| JP | S60-152582 | A | 8/1985 | |
| JP | S62-052028 | A | 3/1987 | |
| JP | 2004-045812 | A | 2/2004 | |
| JP | 2004-184514 | A | 7/2004 | |
| JP | 2005-001134 | A | 1/2005 | |
| JP | 2007-148282 | A | 6/2007 | |
| JP | 2008-003156 | A | 1/2008 | |
| JP | 2008-139542 | A | 6/2008 | |
| JP | 2008-197214 | A | 8/2008 | |
| JP | 2009-217179 | A | 9/2009 | |
| JP | 2011-033822 | A | 2/2011 | |
| JP | 2011-105450 | A | 6/2011 | |
| JP | 2011-136514 | A | 7/2011 | |
| WO | 2020/066421 | A1 | 4/2020 | |
| WO | 2020/066422 | A1 | 4/2020 | |

OTHER PUBLICATIONS

Japanese Office Action (Decision to Refusal) for the related Japanese Patent Application No. 2018-184809 dated Dec. 23, 2022.
Chinese Office Action for the related Chinese Patent Application No. 201980064009.X dated Jul. 5, 2022.
The extended European Search Report for the related European Patent Application No. 19864811.5 dated Aug. 30, 2022.
The Invitation pursuant to Rule 62a(1) EPC for the related European Patent Application No. 19 864 811.5 dated May 2, 2022.
International Search Report and Written Opinion of the International Search Report for PCT/JP2019/033465 dated Dec. 3, 2019.
Japanese Office Action for the related Japanese Patent Application No. 2018-184809 dated May 27, 2022.
Decision of Refusal for the related Japanese Patent Application No. 2018-184809 dated Jun. 16, 2023.
Decision of Dismissal of Amendment for the related Japanese Patent Application No. 2018-184809 dated Jun. 16, 2023.
International Preliminary Report on Patentability and English language Written Opinion of the International Search Report for PCT/JP2019/033465 dated Mar. 23, 2021.
The Specification and Drawings filed in U.S. Appl. No. 17/214,458.
United States Office Action issued in U.S. Appl. No. 17/214,458 on Sep. 8, 2023.
United States Office Action issued in U.S. Appl. No. 17/214,458 on Jan. 8, 2024.
United States Office Action issued in U.S. Appl. No. 17/214,458 on Apr. 15, 2024.
United States Office Action issued in U.S. Appl. No. 17/214,458 on May 30, 2024.
Communication pursuant to Article 94(3) EPC for the related European Patent Application No. 19864811.5 dated Sep. 26, 2024.
International Preliminary Report on Patentability and English language Written Opinion of the International Search Report for PCT/JP2019/033466 dated Mar. 23, 2021.
The Invitation Pursuant to Rule 62a (1) EPC for the related European Patent Application No. 19867007.7 dated dated Mar. 9, 2022.
Japanese Office Action for the related Japanese Patent Application No. 2018-184810 dated Apr. 25, 2022.
The extended European Search Report for the related European Patent Application No. 19867007.7 dated May 23, 2022.
Chinese Office Action for the related Chinese Patent Application No. 201980064010.2 dated Jul. 5, 2022.
International Search Report and Written Opinion of the International Search Report for PCT/JP2019/033466 dated Nov. 19, 2019.

* cited by examiner

MEDIUM INCLUDING RELEASE MATERIAL, SLIT, AND PRINT LABEL AND METHOD OF WRAPPING THE SAME

CROSS REFERENCE TO RELATED APPLICATION

This application is a by-pass continuation-in-part application of International Application No. PCT/JP2019/033465 filed Aug. 27, 2019 claiming priority from Japanese Patent Application No. 2018-184809 filed Sep. 28, 2018. The entire contents of the international application and the priority application are incorporated herein by reference.

TECHNICAL FIELD

The present disclosure relates to a medium that is mounted and used in a printer, and a method of wrapping the same.

BACKGROUND

A label (corresponding to the medium) known in the art is provided with adhesive on the back side thereof. The label is mounted in a printer. Once printed, the label is used by attaching the label to the curved surface of an object. Depending on the application, the user may wish to wrap the label around an object such that the label is rotatably attached. For this purpose, there is known a technology for coating the adhesive on the label with varnish or another non-adhesive material so that adhesive in the portion of the label present around the outside of the object does not adhere to the object.

SUMMARY

However, a configuration such as the conventional technology described above, in which the adhesive is coated with a non-adhesive material such as varnish, may degrade due to stress incurred when wrapping the label around the object, changes in ambient conditions, or aging. With such degradation, the adhesive may become exposed and inhibit rotation of the label.

It is an object of the present disclosure to provide a medium whose rotation relative to an object does not become impeded due to stress incurred when wrapped around an object, changes in ambient conditions, or aging.

In order to attain the above and other objects, the present disclosure provides a medium to be mounted in and to be printed with a printer. The medium includes: a release material; a slit; and a print label. The release material is opaque. The slit is provided in the release material and has a square shape including a first side, a second side, a third side, and a fourth side. The first side and the second side oppose each other. The third side and the fourth side oppose each other. The print label is fixed to the release material so as to span across the first side of the slit.

According to another aspect, the present disclosure also provides a medium to be mounted in and to be printed with a printer. The medium includes: a release material; a slit; and a print label. The release material has a composition that includes at least one of paper, colored film, fabric, and metal. The slit is provided in the release material and has a square shape including a first side, a second side, a third side, and a fourth side. The first side and the second side oppose each other. The third side and the fourth side oppose each other. The print label is fixed to the release material so as to span across the first side of the slit.

According to still another aspect, the present disclosure also provides a medium to be mounted in and to be printed with a printer. The medium includes: a release material layer; at least two slits; and a print label layer. The release material layer has a rectangular shape including a first short side on one side in a first direction and a second short side on another side in the first direction. The at least two slits are parallel to each other. Each of the at least two slits extends in the first direction from the first short side to the second short side of the release material layer. The print label layer is fixed to the release material layer so as to span across the at least two slits. The at least two slits include a first slit and a second slit.

According to still another aspect, the present disclosure also provides a method of wrapping a label around a cable. The label has a front surface and a back surface. A printed image is formed on the front surface. The back surface includes an adhesive layer. A release material is fixed on the adhesive layer so that the adhesive layer is exposed. The release material has a square shape including a first side and a second side. The first side and the second side oppose each other. The adhesive layer has a first portion and a second portion. The first portion is on a side of the first side of the release material. The second portion is on a side of the second side of the release material. The first portion and the second portion are exposed. The method includes: encircling; and bonding. The encircling encircles the cable with the label so that the release material is on an inside. The bonding bonds the first portion of the adhesive layer and the second portion of the adhesive layer together while aligning the first side and the second side in an encircling direction.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Below, embodiments of the present disclosure will be described with reference to FIG. 1 through FIG. 7B.

<Label-Creating Device>

First, the functional configuration of a label-creating device according to the present embodiment will be described with reference to FIG. 1.

Figure 1:
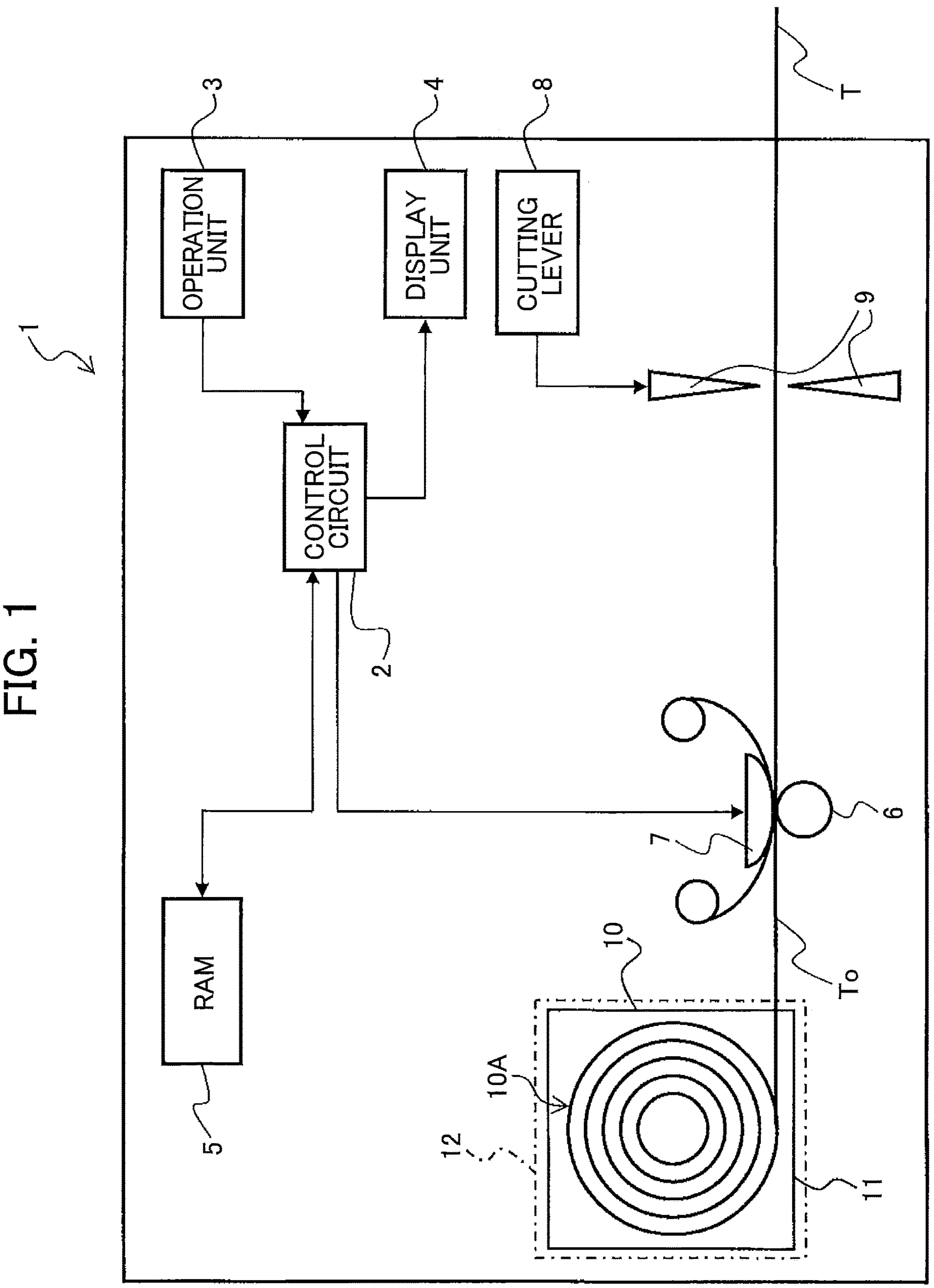
FIG. 1 is an explanatory diagram showing a schematic configuration of a label-creating device according to one embodiment of the present disclosure.

In FIG. 1, a label-creating device 1 (corresponding to the printer) has a control circuit 2, an operation unit 3 on which the user (operator) can perform desired operations, a display unit 4 for displaying prescribed information, a RAM 5 for storing various information, a conveying roller 6, a print head 7, a cutting lever 8, and a cutter 9.

A cartridge holder 12 is also provided in the label-creating device 1. A tape cartridge 10 (corresponding to the cassette) is detachably mounted in the cartridge holder 12. The tape cartridge 10 has a casing 11, and a tape roll 10A (depicted in the drawing as concentric circles for simplification but actually wound into a roll) accommodated in the casing 11. A printing tape To is wound in a roll shape to form the tape roll 10A. Here, the tape cartridge 10 may be a die-cut label type or a continuous length type (described later with reference to FIGS. 11A through 11E). In the die-cut label type, a printing tape To having half-cuts HC (described later with reference to FIGS. 2A through 2E) formed therein is wound about the tape roll 10A. In the continuous length type, a printing tape To having no half-cuts HC is wound about the tape roll 10A. Either type of tape cartridge 10 can be used in the label-creating device 1. Unless otherwise stated, the following example describes a case of using the die-cut label type tape cartridge 10. The half-cuts HC are configured of perforations, for example. In this specification, a "perforation" denotes a plurality of holes provided intermittently in a fine line along the surface direction of a target layer, with each hole penetrating the target layer in the thickness direction (the same applies hereafter).

The control circuit 2 is provided with a CPU and a ROM not shown in the drawings. The control circuit 2 executes various programs pre-stored in the ROM while utilizing the temporary storage function of the RAM 5 in order to perform overall control of the label-creating device 1.

The conveying roller 6 is disposed in opposition to the print head 7. The printing tape To paid out from the tape roll 10A is interposed between the conveying roller 6 and print head 7. By rotating, the conveying roller 6 conveys the printing tape To while pulling the printing tape To from the tape roll 10A.

The print head 7 prints desired print objects (see the printed images R described later) on main label parts Lo (described later in greater detail) of the printing tape To conveyed by the conveying roller 6. The print objects are user-specified characters, icons, and the like.

When actuated through a user operation on the cutting lever 8, the cutter 9 cuts off a printed section of a printing tape T (described later in greater detail) having a plurality of print labels L formed along the conveying direction. Note that the printing tapes To and T correspond to the medium in the claims.

<Printing Tape>

Figure 2A:
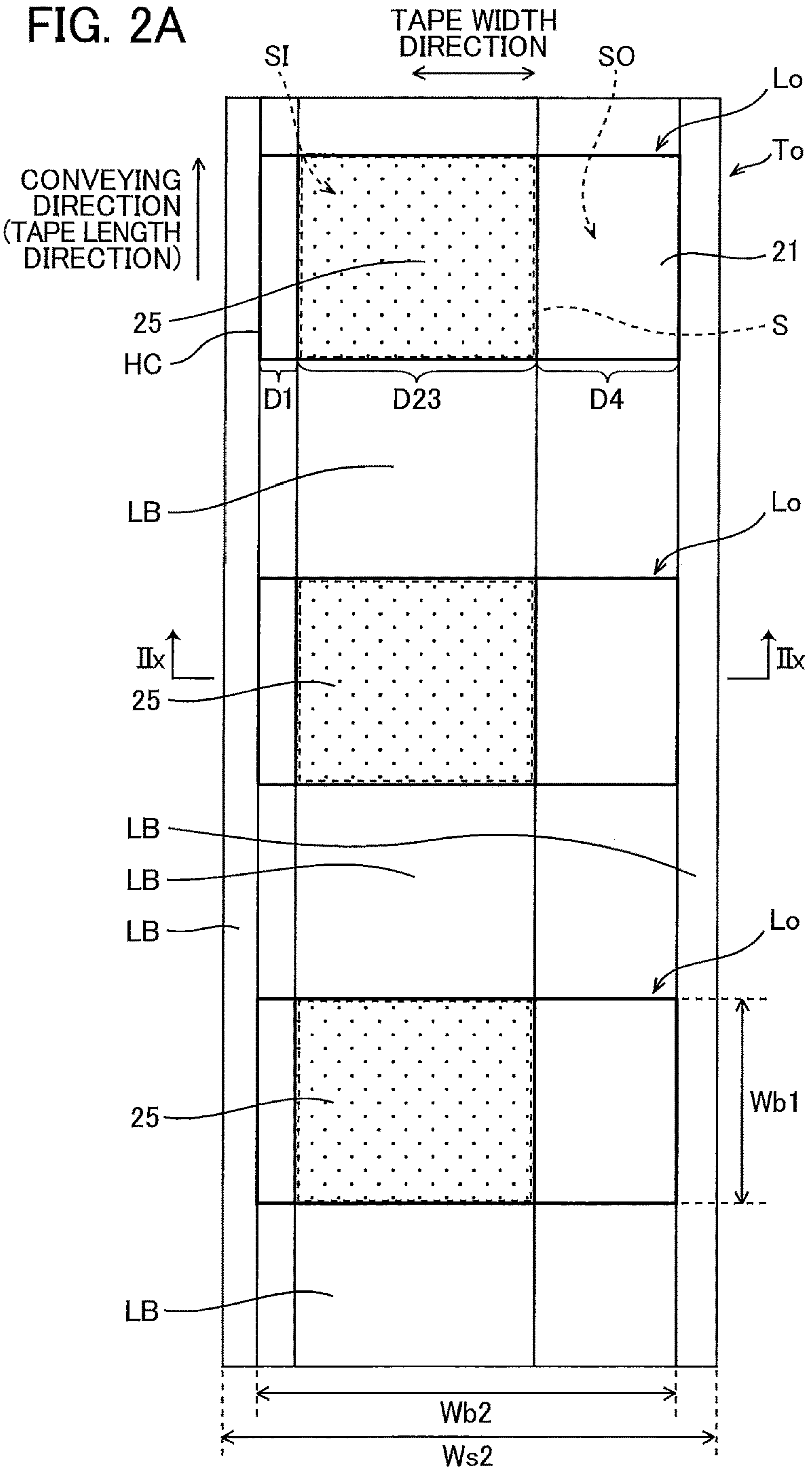
FIG. 2A is a plan view showing a printing tape in an unprinted state.
Figure 2B:
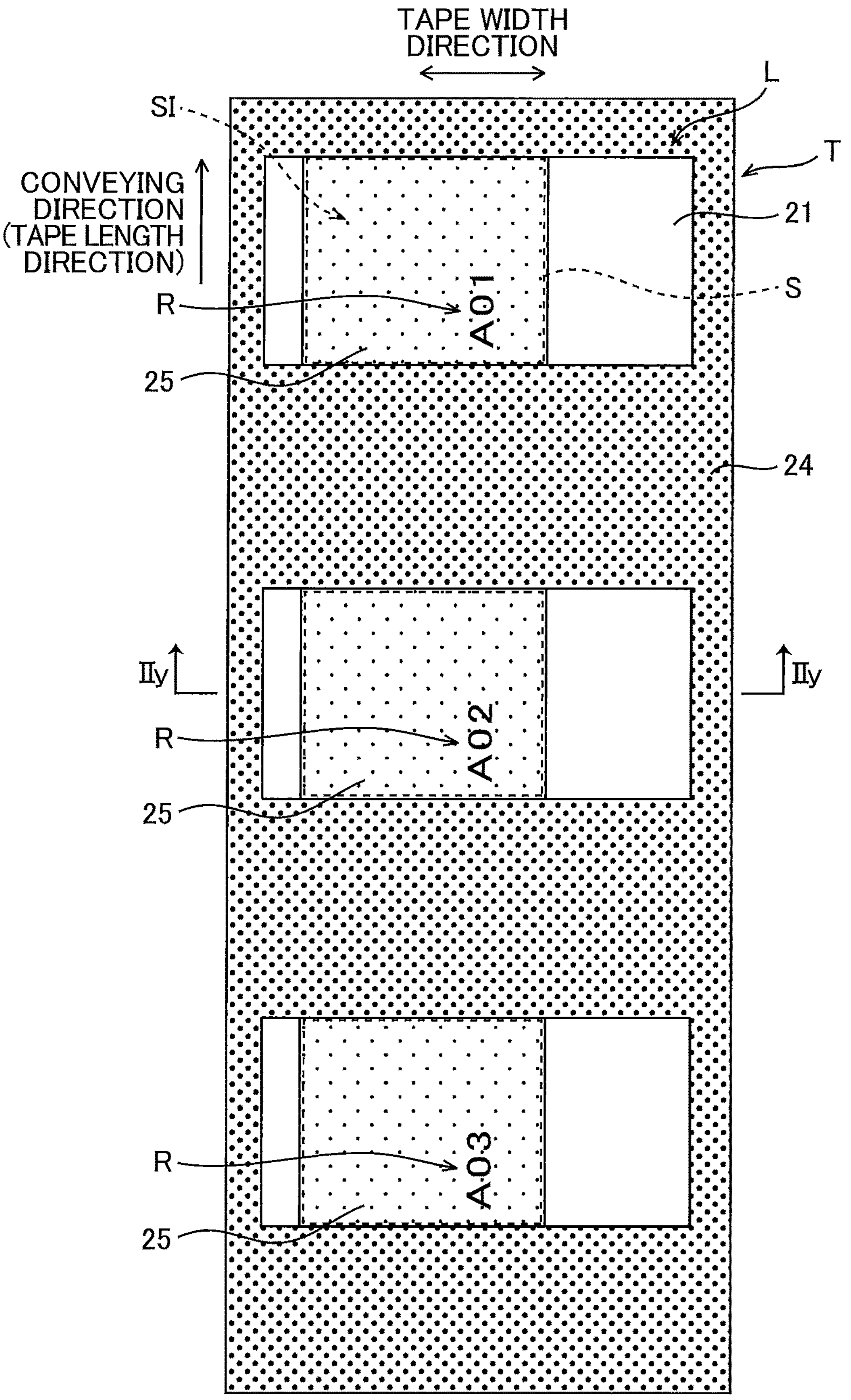
FIG. 2B is a plan view showing a printed printing tape after an excess label portion has been peeled off.
Figure 2C:
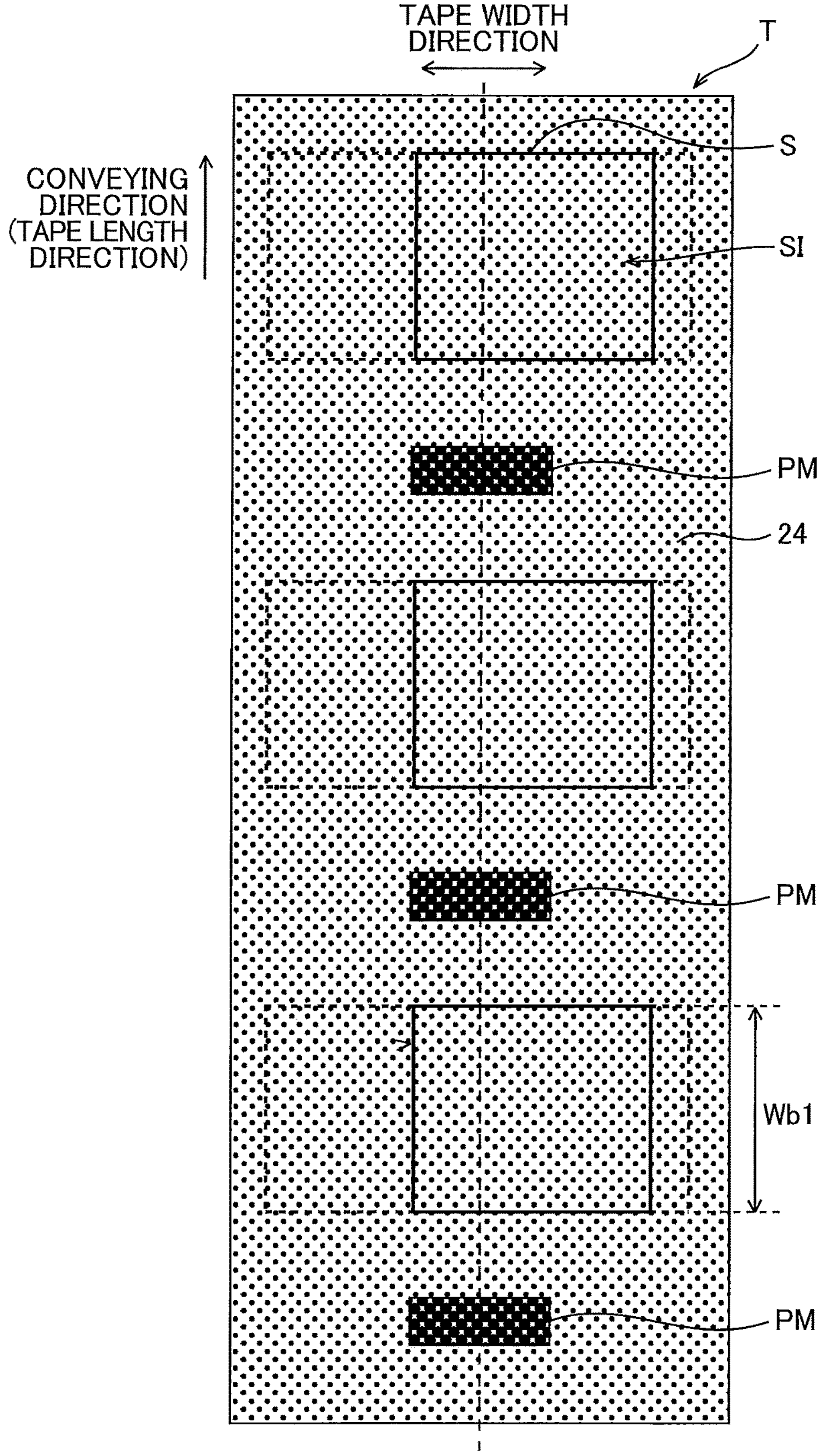
FIG. 2C is a rear view showing the printed printing tape.
Figure 2D:
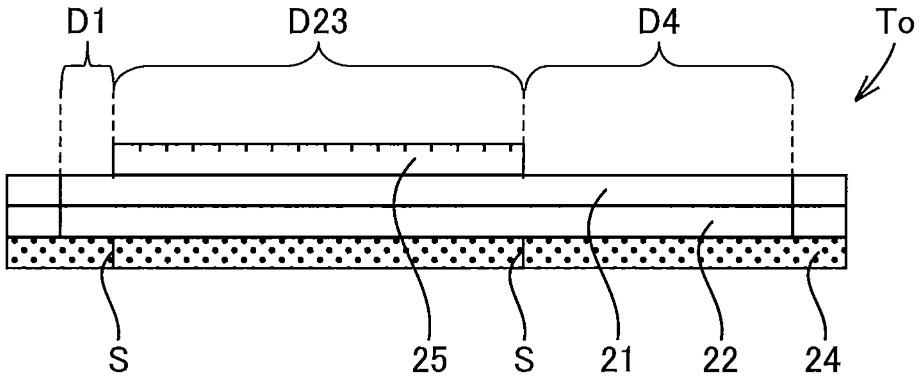
FIG. 2D is a cross-sectional view taken along a section IIx-IIx of the structure shown in FIG. 2A.
Figure 2E:
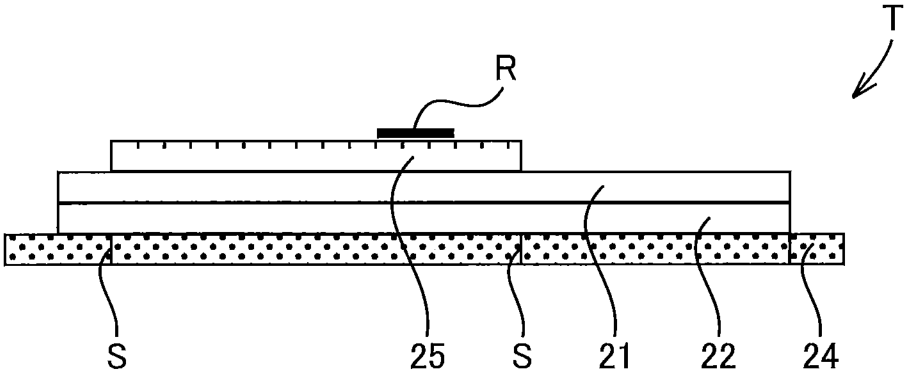
FIG. 2E is a cross-sectional view taken along a section IIy-IIy of the structure shown in FIG. 2B (b)

FIGS. 2A through 2E show the detailed structure of the printing tape To. FIG. 2A is a plan view showing the printing tape To in an unprinted state. The up-down direction in the drawing corresponds to the conveying direction (the tape length direction), the left-right direction in the drawing corresponds to the tape width direction, and the near-far direction in the drawing corresponds to the tape thickness direction. FIG. 2B shows a plan view of the printing tape T on which the printed image R has been printed and after an excess label portion has been peeled off. FIG. 2C is a rear view of the printed printing tape T. FIG. 2D is a cross-sectional view taken along the section IIx-IIx of the structure shown in FIG. 2A. FIG. 2E is a cross-sectional view taken along the section IIy-IIy of the structure shown in FIG. 2B.

As shown in FIGS. 2A through 2D, each of the printing tapes To and T includes an opaque release material layer 24 (corresponding to the release material), a transparent adhesive layer 22 (corresponding to the adhesive layer), and a transparent base layer 21 having compositions that include paper or colored film or fabric or metal. The release material layer 24, adhesive layer 22, and base layer 21 are layered in sequence in the thickness direction (the depth direction in the perspective of FIG. 2A and FIG. 2B, the vertical direction in FIG. 2D, and hence the direction in which each layer is laminated, as will be described later) from a first side of the thickness direction (the bottom in FIG. 2D, the far side in FIGS. 2A and 2B, and the near side in FIG. 2C) toward a second side of the thickness direction (the top in FIG. 2D, the near side in FIGS. 2A and 2B and the far side in FIG. 2C). Note that the adhesive layer 22 may be provided in part, rather than over the entire surface, on the back side (the bottom side in FIG. 2D) of the base layer 21, i.e., between the base layer 21 and release material layer 24.

In the printing tapes To and T having the layered structure described above, a plurality of main label parts Lo (or print labels L having a printed image R formed on each of the main label parts Lo) are arranged successively in the tape length direction (the up-down direction in the drawings) while separated by an excess label portion LB (see FIG. 2A). In other words, main label parts Lo (or print labels L) are arranged discretely along the tape length direction. These main label parts Lo (or print labels L) are all arranged with their longitudinal directions oriented in the tape width direction (left-right direction in the drawings). The base layer 21 is divided by the half-cuts HC (perforations) into the main label parts Lo and the remaining excess label portion LB and is fixed via the adhesive layer 22 to the surface on the second side of the release material layer 24 in the thickness direction. The main label parts Lo correspond to the print label in the claims, and the excess label portion LB corresponds to the label in the claims.

At this time, a print background layer 25 (corresponding to the printing portion) is also partially provided on the front-side (the top in FIG. 2D) surface of the base layer 21 at a position within the main label part Lo (see FIGS. 2A, 2B, 2D, and 2E). The print background layer 25 has a suitable non-transparent color and the print head 7 forms the printed image R therein.

Owing to the layered structure described above, each main label part Lo has a length Wb2 in the tape width direction and a width Wb1 in the tape length direction and includes three areas: an adhesive area D1 constituting the left end portion in the drawings; a non-adhesive area D23 provided adjacent to the adhesive area D1 and corresponding to the print background layer 25; and an adhesive area D4 provided adjacent to the non-adhesive area D23. Here, a length Ws2 of the printing tapes To and T in the tape width direction is greater than the length Wb2 of the main label parts Lo in the tape width direction.

In the release material layer 24, rectangular (square) slits S are formed. Each of these slits S is arranged such that the adhesive area D1 and adhesive area D4 are positioned in a slit outer area SO outside the slit S in a plan view, while the non-adhesive area D23 is positioned in a slit inner area SI inside the slit S in a plan view.

The print background layer 25 is arranged with at least a portion overlapping at least a portion of the slit inner area SI enclosed by the slit S. In this example, the print background layers 25 have the same dimensions in the tape width direction and tape length direction as the slits S and the entirety of the print background layers 25 overlap slit inner areas SI within the corresponding slits S. In other words, the slits S overlap the print background layers 25 in a plan view.

Note that marks PM are provided on the release material layer 24 in intermediate parts between neighboring slits S. The marks PM are used for positioning control when the conveying roller 6 conveys the printing tape To. That is, the label-creating device 1 is provided with a well-known reflective optical sensor (not illustrated) having a light-emitting unit and a light-receiving unit. During the positioning control, the optical sensor emits light from the light-emitting unit while the light-receiving unit receives light reflected off the release material layer 24. At this time, the marks PM on the release material layer 24 are detected based on the difference in the amount of light received between portions of the release material layer 24 on which the marks PM are provided and all other portions, and the printing tape To is positioned based on these detections.

According to the structure of the release material layer 24 described above, the rectangular slits S are juxtaposed on the printing tapes To and T along the up-down direction, and a print background layer 25 is positioned in each slit inner area SI surrounded by a slit S. A printed image R is formed in the print background layer 25 in each of the print labels L. The printed images R are print objects respectively configured of the text "A01," "A02," "A03," and the like in this example. The term "slit" in this specification denotes a cut penetrating the target layer in the thickness direction (the same applies hereafter). A configuration in which the target layer is partially cut in the thickness direction (the cut enters a fixed amount in the thickness direction) may be used in place of these slits (the same applies hereafter).

<Separating Print Labels by Peeling>

Figure 3A:
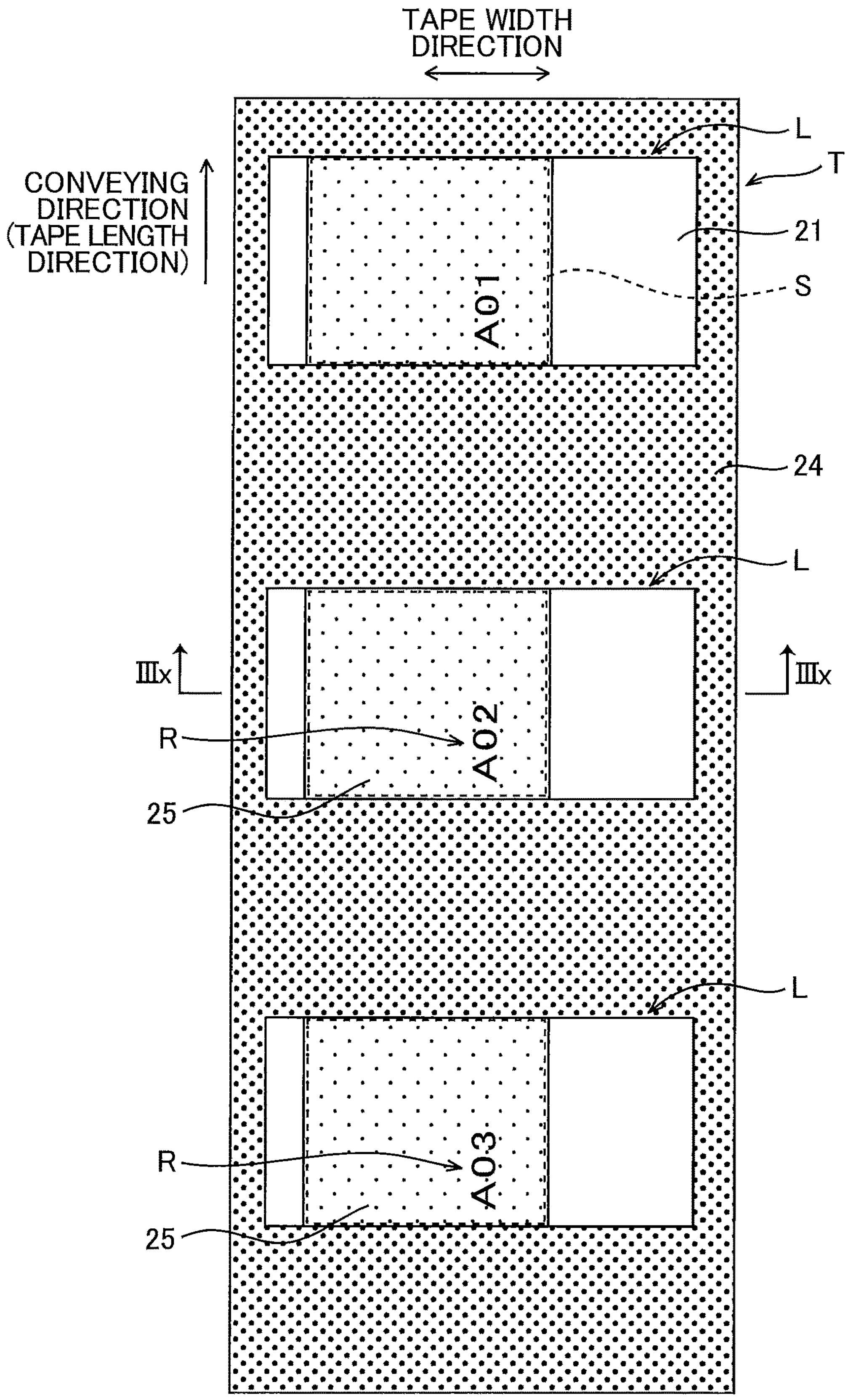
FIG. 3A is a plan view showing the printed printing tape.
Figure 3B:
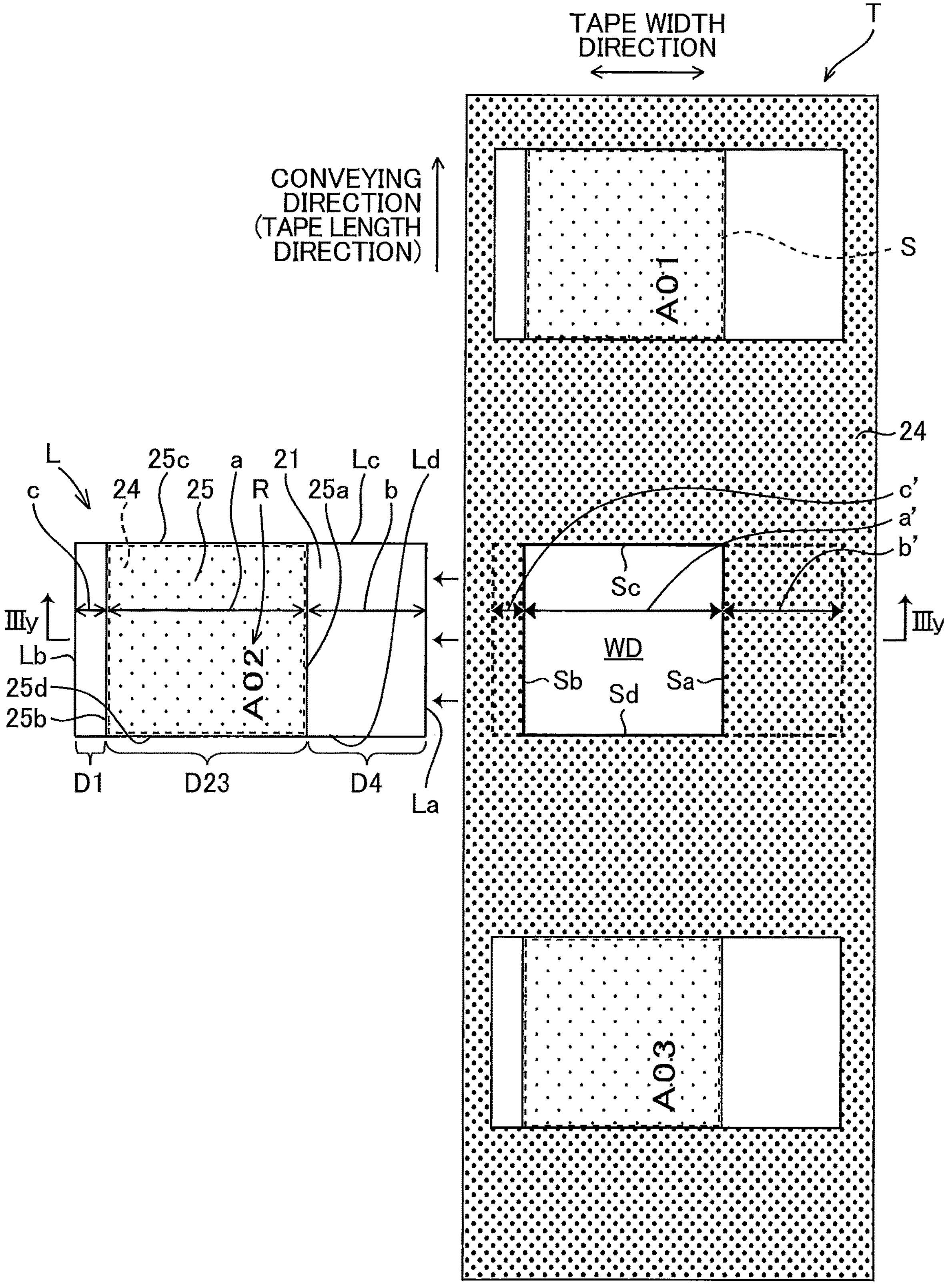
FIG. 3B is a plan view showing a state of the printed printing tape after single print label has been peeled off.
Figure 3C:
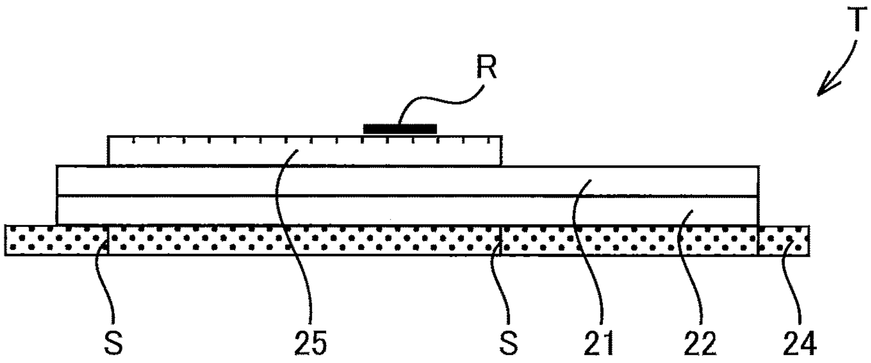
FIG. 3C is a cross-sectional view taken along a section IIIx-IIIx of the structure shown in FIG. 3A.
Figure 3D:
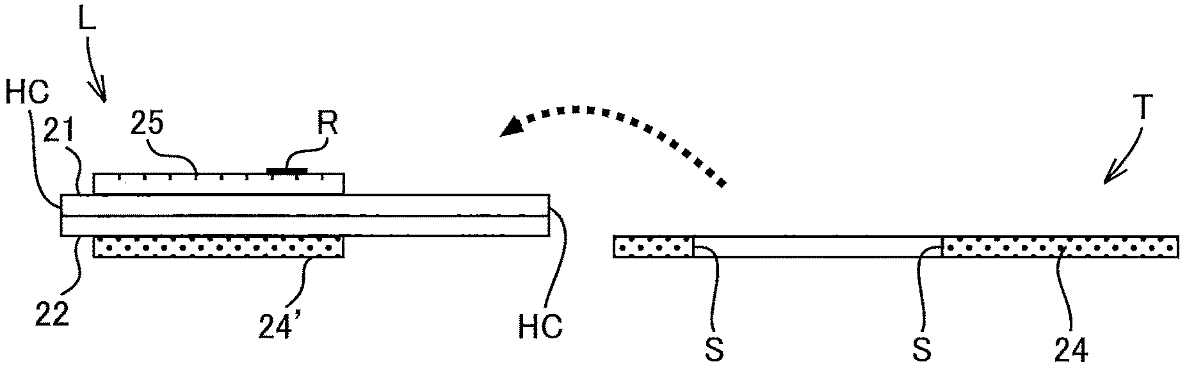
FIG. 3D is a cross-sectional view taken along a section IIIy-IIIy of the structure shown in FIG. 3B.
Figure 4B:
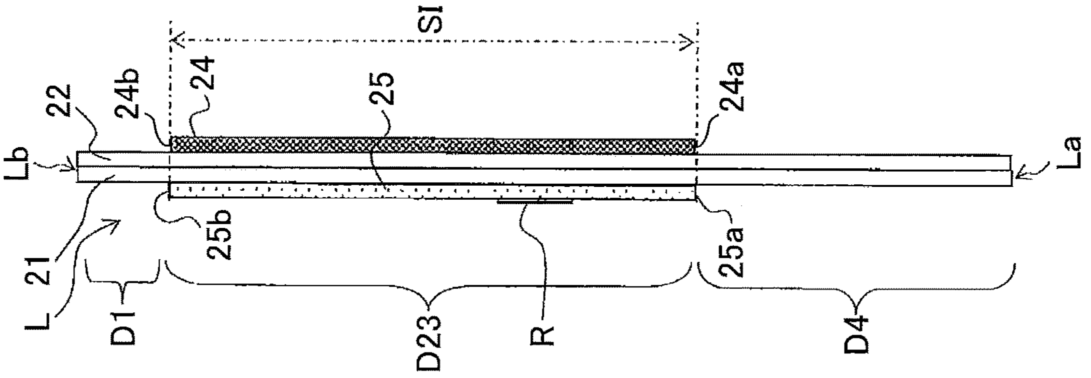
FIG. 4B is a cross-sectional view taken along a section IVB-IVB shown in FIG. 4A.

With the printing tapes To and T described above, first the excess label portion LB is separated from the main label parts Lo and the release material layer 24 (see FIGS. 2B and 3A) by peeling the excess label portion LB from the top surface of the release material layer 24, as shown in FIG. 2A. Note that a printing tape To may be provided with an initial configuration that omits the excess label portion LB from FIG. 2A (i.e., a configuration that omits printed images R from FIG. 2B). Next, owing to the square-shaped slits S provided in the release material layer 24 in advance, each print label L included on the printing tape T and having a printed image R formed on the print background layer 25 as described above can be peeled off while leaving the square-shaped portion 24' of the release material layer 24 located inside the slit S (the portion included in the slit inner area SI) on the adhesive layer 22 side (i.e., with the square-shaped portion covering the adhesive layer 22), as shown in FIG. 3B. The square-shaped portion 24' of the release material layer 24 has opposing sides configured of a side 24*a* (corresponding to the first side of the release material, and corresponding to the side Sa of the slit S) and a side 24*b* (corresponding to the second side of the release material, and corresponding to the side Sb of the slit S), as shown in FIG. 4B. In the following description, this peeled off portion will simply be called the "print label L," and the square-shaped portion 24' will simply be called the "release material layer 24" for convenience. After the print label L has been peeled off, a space (a window WD) will remain in the strip-like release material layer 24 inside the rectangular slit S, as illustrated in FIG. 3B.

<Description of the Slits>

As described above, each slit S has a square shape. More specifically, as shown in FIG. 3B, the slit S includes opposing sides configured of a side Sa (corresponding to the first side) and a side Sb (corresponding to the second side), and opposing sides configured of a side Sc (corresponding to the third side) and a side Sd (corresponding to the fourth side). The main label part Lo (i.e., the print label L after being printed; the same applies hereafter) is fixed to the release material layer 24 so as to span across both the side Sa and the side Sb of the corresponding slit S.

In accordance with the structure of the slit S, the print background layer 25 is formed in a square shape having a side 25*a* (corresponding to the ninth side, and corresponding to the side Sa of the slit S), a side 25*b* (corresponding to the tenth side, and corresponding to the side Sb of the slit S), a side 25*c* (corresponding to the eleventh side, and corresponding to the side Sc of the slit S), and a side 25*d* of the slit S (corresponding to the twelfth side, and corresponding to the side Sd of the slit S).

In accordance with the above configuration, the main label part Lo is formed in a square shape with opposing sides configured of a side La (corresponding to the fifth side) and a side Lb (corresponding to the sixth side), and opposing sides configured of a side Lc (corresponding to the seventh side) and a side Ld (corresponding to the eighth side). The side Lc and side Ld are parallel to the side Sc and side Sd of the slit S and within proximity (a distance within 3 mm, for example) of the same respectively. As described above, the excess label portion LB is connected to the sides Lc and Ld and sides La and Lb of each main label part Lo via half-cuts HC configured of perforations. However, between the sides Lc and Ld of the main label part Lo and the excess label portion LB only, the perforated half-cuts HC may be replaced with slits similar to the slits S described above. In this case, the printing tape To must be provided with the excess label portion LB to prevent the main label parts Lo or print labels L from flapping or peeling off the printing tape To while being conveyed through the label-creating device 1 in the tape length direction.

Note that the print background layer 25 may be smaller than the slit inner area SI enclosed by the slit S. More specifically, the side Sc of the slit S may be offset toward the side Ld of the main label part Lo rather than the side Lc of the main label part Lo, and side Sd of the slit S may be offset toward the side Lc of the main label part Lo rather than the side Ld of the main label part Lo.

<Dimensional Relationships Among Main Label Parts and Slits>

In the present embodiment, the side La of the main label part Lo is on the side closer to the side Sa than the side Sb of the slit S, and the side Lb of the main label part Lo is on the side closer to the side Sb than the side Sa of the slit S, as illustrated in FIG. 3B.

Additionally, the shortest distance b' between the side Sa of the slit S and the side La of the main label part Lo is greater than the shortest distance c' between the side Sb of the slit S and the side Lb of the main label part Lo. Further, the shortest distance a' between the side Sa and side Sb of the slit S is between one and three times the shortest distance b'.

In the present embodiment, the side La of the main label part Lo is on the side closer to the side 25*a* than the side 25*b* of the print background layer 25, and the side Lb of the main label part Lo is on the side closer to the side 25*b* than the side 25*a* of the print background layer 25, as illustrated in FIG. 3B. Further, the shortest distance b between the side 25*a* of the print background layer 25 and the side La of the main label part Lo is greater than the shortest distance c between the side 25*b* of the print background layer 25 and the side Lb of the main label part Lo. Further, the shortest distance a between the side 25*a* and side 25*b* of the print background layer 25 is between one and three times the shortest distance b.

Additionally, the shortest distance b between the side 25*a* of the print background layer 25 and the side La of the main label part Lo is greater than the shortest distance c between the side 25*b* of the print background layer 25 and the side Lb of the main label part Lo. Further, the shortest distance a between the side 25*a* and side 25*b* of the print background layer 25 is between one and three times the shortest distance b.

<Print Label>

Figure 4A:
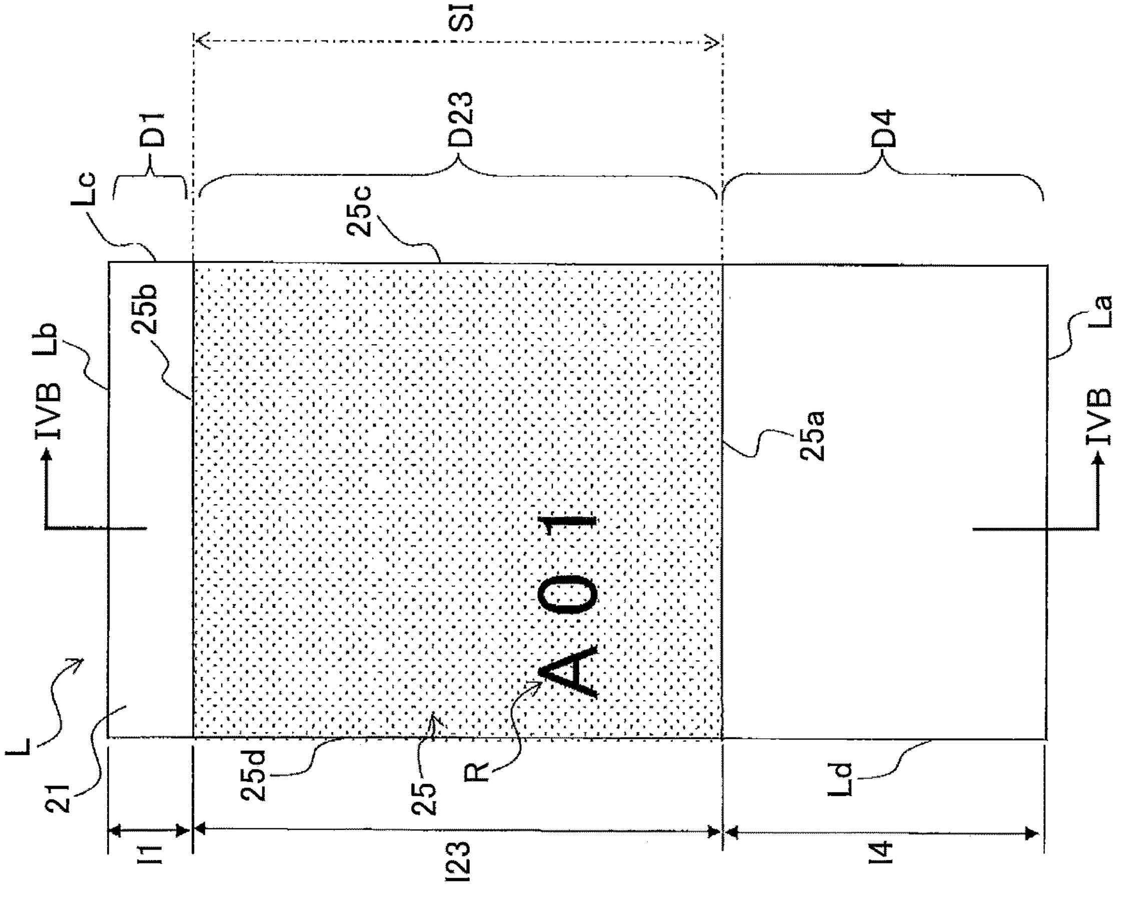
FIG. 4A is a plan view showing the print label.

Next, the structure of the print label L generated as described above will be described with reference to FIGS. 4A and 4B. FIG. 4A shows a plan view of one print label L separated as described above, and FIG. 4B shows a cross-sectional view along the section IVB-IVB in FIG. 4A.

As with the printing tape T described earlier, the print label L shown in FIGS. 4A and 4B has the transparent base layer 21, the transparent adhesive layer 22, and the opaque release material layer 24 arranged in sequence along the thickness direction (the depth direction in FIG. 4A and the left-right direction in FIG. 4B) from the left side to the right side in FIG. 4B. The print background layer 25 having the printed image R is partially provided on the second side surface of the base layer 21 relative to the thickness direction. The print label L is provided with the adhesive area D1, non-adhesive area D23, and adhesive area D4 described above from another side (the top in the drawing) of the tape width direction toward one side (the bottom in the drawing) in the tape width direction.

In the adhesive area D1, the base layer 21 and adhesive layer 22 are layered in order from the second side toward the first side of the thickness direction (from the left side to the right side in FIG. 4B). Thus, the entire region of the adhesive area D1 is provided with an adhesive property owing to the adhesive layer 22. Note that the adhesive area D1 is provided with a length 11 in the tape width direction.

In the non-adhesive area D23, the print background layer 25 provided with the printed image R, the base layer 21, the adhesive layer 22, and the release material layer 24 are layered in order from the second side toward the first side of the thickness direction (from the left side to the right side in FIG. 4B). Thus, the entire area of the non-adhesive area D23 is non-adhesive, as the adhesive property of the adhesive layer 22 is inhibited by the release material layer 24. In this example, the print background layer 25 is formed by applying ink (an ink coating layer) of a suitable color (a light transmissive color in this example, including transparent colors) on the base layer 21, and the print head 7 forms the printed image R, which is the text "A01," as described above. The non-adhesive area D23 has a length 13 in the tape width direction.

In the adhesive area D4, the base layer 21 and adhesive layer 22 are layered in order from the second side toward the first side of the thickness direction (from the left side to the right side in FIG. 4B). Thus, the entire area of the adhesive area D4 is provided with an adhesive property through the adhesive layer 22. The adhesive area D4 has a length 14 in the tape width direction.

The entire surface of the print label L on the second side of the thickness direction corresponds to the front surface in the claims, and the entire surface of the print label L on the first side of the thickness direction corresponds to the back surface of the claims.

<Procedure for Attaching a Print Label to an Object>

Figure 5C:
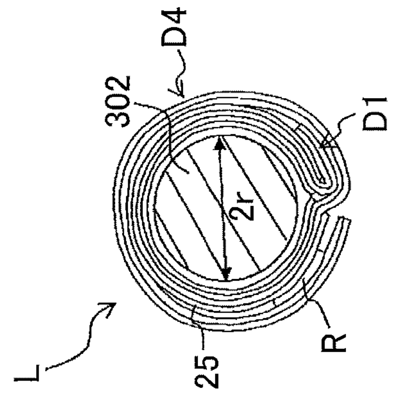
FIGS. 5A through 5C are explanatory diagrams showing a procedure for attaching the print label to an object.
Figure 5B:
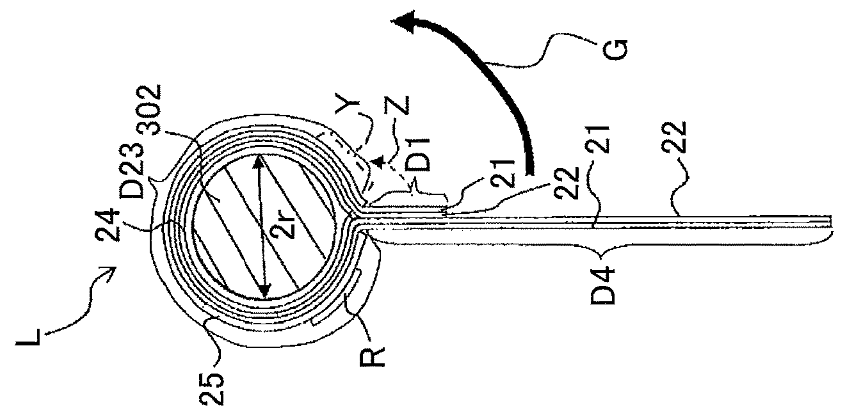
Figure 5A:
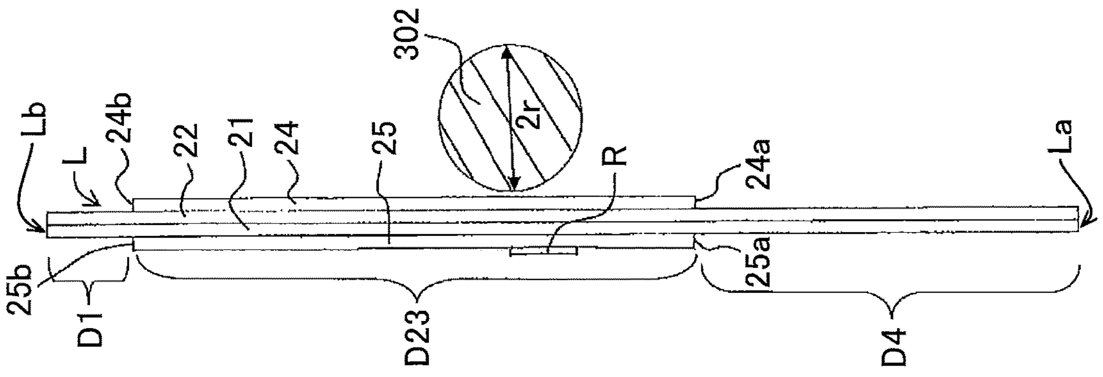

FIGS. 5A through 5C show a sample procedure for attaching the print label L to an object. In the example of FIGS. 5A through 5C, the print label L is attached by wrapping the print label L around a cable-like (i.e., columnar-shaped) object 302 (hereinafter simply called a "cable 302" for convenience) having a diameter 2*r*.

As shown in FIG. 5A, the print label L extends in the order: adhesive area D1→non-adhesive area D23 covered by the separated release material layer 24→adhesive area D4. (In other words, the adhesive layer 22 of the print label L is exposed in the adhesive areas D1 and D4, which are not covered by the release material layer 24.) First, the adhesive area D1 and non-adhesive area D23 of the print label L are bent into a concave shape (not illustrated) so that the release material layer 24 side (the right side in FIG. 5A) is on the inside.

Next, the cable 302 is placed on the inside of the concave-shaped print label L, and the print label L is wrapped once around the cable 302 to form a cylindrical body encircling the cable 302, as shown in FIG. 5B. Subsequently, the adhesive layer 22 (functioning as the second portion of the adhesive layer on the side of the second side in the claims) on the adhesive area D1 positioned on the distal end and the adhesive layer 22 (functioning as the first portion of the adhesive layer on the side of the first side in the claims) on the adhesive area D4 are bonded together while aligning the positions of the two adhesive layers 22 in the tape width direction (also known as butt-sealing). At this time, the length of the release material layer 24 in the tape width direction is at least greater than or equal to the circumference 2πr of the cable 302. As a result, the print label L can be attached to the cable 302 so as to be rotatable about the same by wrapping the non-adhesive area D23 of the print label L around the cable 302 so that the print label L is in a non-adhering state, while fixing the shape of the print label L itself by bonding the two adhesive layers 22 together. Hence, by leaving a portion of the release material layer 24 on the main label part Lo when the release material layer 24 is peeled off, the adhesive layer 22 of the print label L can be prevented from becoming fixed to the cable 302.

Thereafter, the remaining portion of the adhesive area D4 that was not used in the structure encircling the cable 302 is wrapped in the direction of the arrow G indicated in FIG. 5B so that the bonded portion of the adhesive area D1 and adhesive area D4 are on the inside (for example, the adhesive area D1 contacts a back-fold region Y, as indicated by an arrow Z). At this time, the adhesive area D4 is wrapped around the outer circumferential portion of the non-adhesive area D23 while covering the non-adhesive area D23 that constitutes the cylindrical body (see FIG. 5C). Thus, by using the adhesive property of the adhesive layer 22 to affix the adhesive area D4 to the outer circumferential portion of the non-adhesive area D23, the operation for attaching the print label L to the cable 302 is complete.

<Sample Application for the Print Label>

Figure 6:
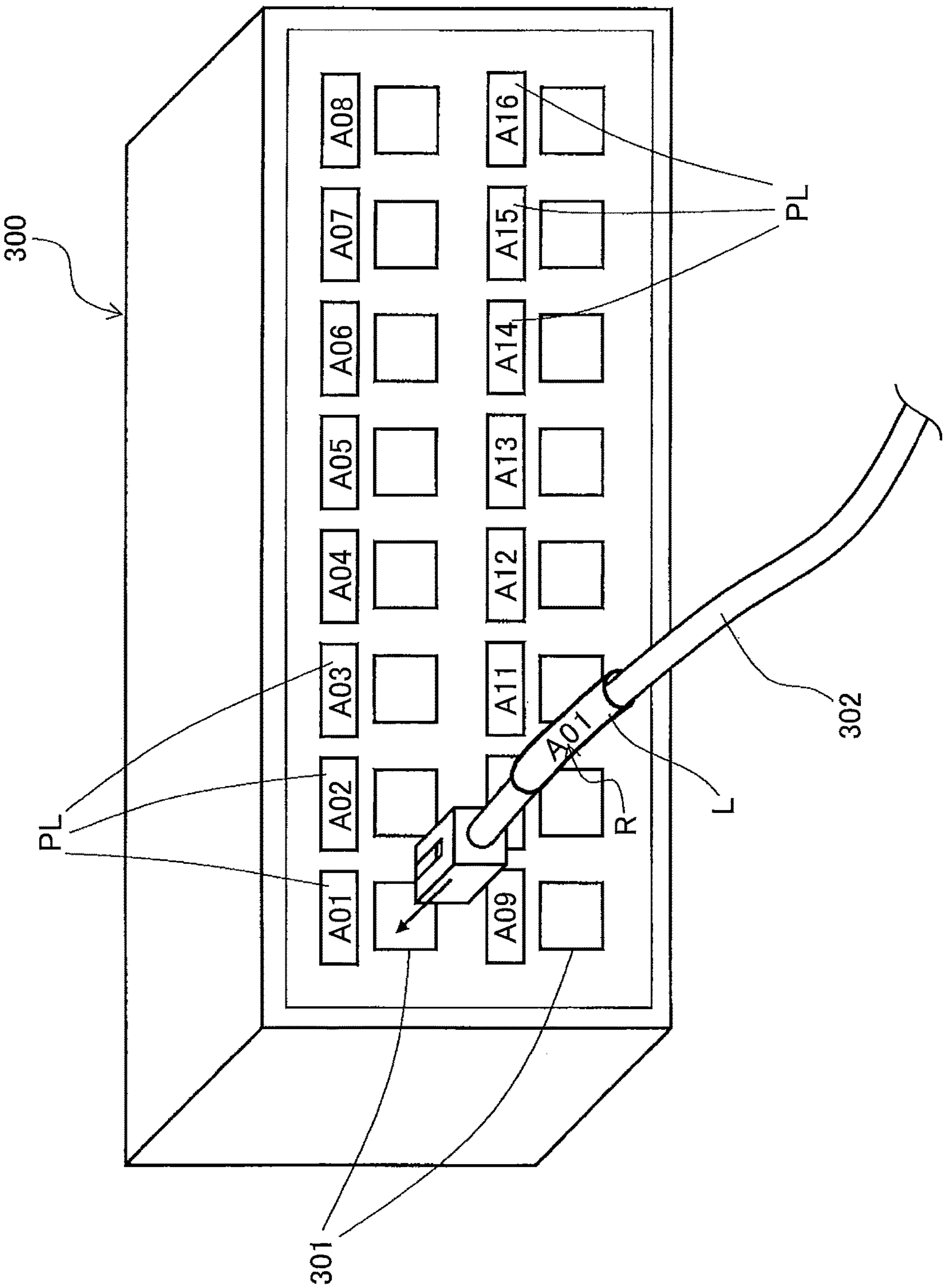
FIG. 6 is a perspective view showing a sample application of the print label.

FIG. 6 shows a sample application of the print label L described above. In this example, a cable for use with a switching hub that relays information over a network, such as a wired LAN, is applied as the cable 302. The switching hub 300 in FIG. 6 has eight slots 301 in each of a top row and a bottom row (a total of sixteen slots).

In the example of the drawing, plates PL indicating the ID names "A01" through "A08" are provided in sequence from the left to correspond to the eight slots 301 in the top row, and plates PL indicating the ID names "A09" through "A16" are provided in sequence from the left to correspond to the eight slots 301 in the bottom row.

The cable 302 must be appropriately connected to the corresponding slot 301. To facilitate connections, the print label L described above is mounted on the end of each cable 302 that is to be inserted into one of the slots 301, and the printed image R formed on each print label L has the same content as the ID name for the slot 301 to which the cable 302 is to be connected. In other words, a print label L printed with the same text as the ID name on the plate PL of the slot 301 to which the cable 302 is to be connected is affixed to the cable 302. This clarifies the correlations between slots 301 and cables 302 that are to be connected to the slots 301, thereby preventing incorrect wiring.

Figure 7A:
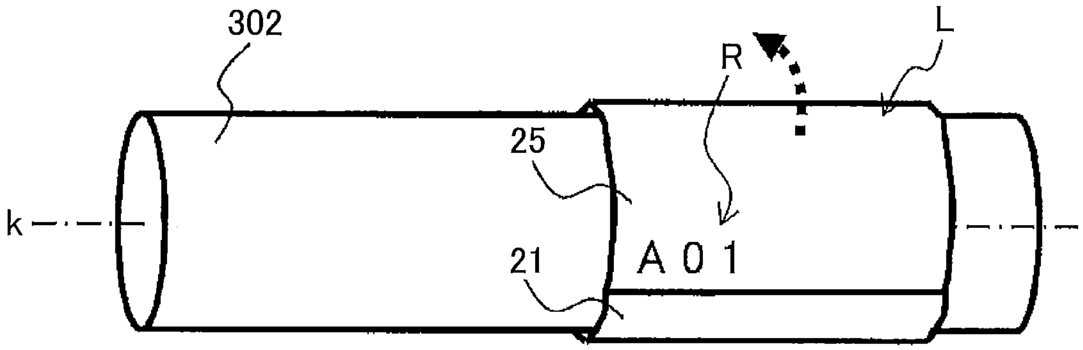
FIGS. 7A and 7B are schematic diagrams showing an attached state of the print label on a cable.
Figure 7B:
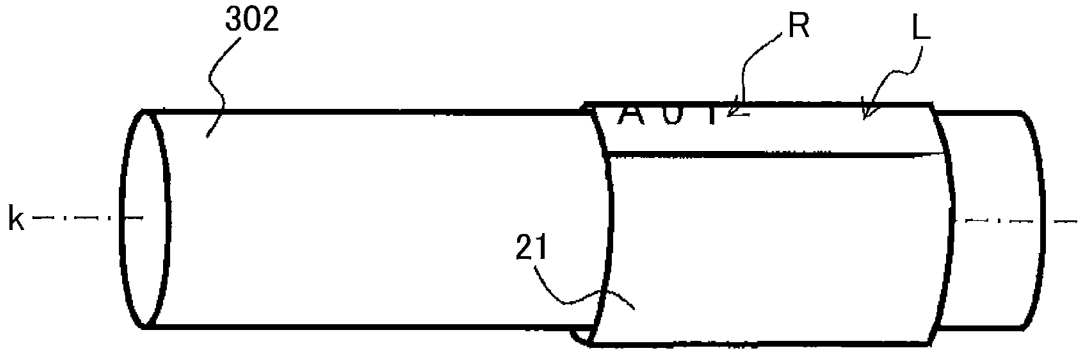

FIGS. 7A and 7B schematically show the attached state of the print label L on the cable 302. An axial center k of the cable 302 is also indicated in the drawing. According to the structure described above, the print label L is affixed to the cable 302 constituting the object so as to be rotatable about the cable 302. In the sample state shown in FIG. 7A, the print background layer 25 is arranged such that the printed image R of "A01" provided on the print background layer 25 is facing the viewer of the drawing. Although the transparent adhesive area D4 is actually present so as to cover the outer circumferential side of the non-adhesive area D23, as depicted in FIG. 5C, the adhesive area D4 has been omitted from FIG. 7A and FIG. 7B described later to prevent complicating the diagram and to facilitate understanding. The print label L can be shifted to the orientation shown in FIG. 7B by rotating the print label L in the direction of the dashed arrow (i.e., a circumferential direction) from the state shown in FIG. 7A. Similarly, if the printed image R is not easily readable when the print label L is fixed to the cable 302 in the position shown in FIG. 7B, the print label L is rotatable as described above owing to the release material layer 24. Accordingly, by rotating the print label L in the direction opposite that described above to the position shown in FIG. 7A, the printed image R can be made visible.

Effects of the Embodiment

In the present embodiment described above, when the release material layer 24 is peeled off the main label part Lo as described with reference to FIG. 3B, a square-shaped area of the release material layer 24 positioned inside the slit S separates from the remaining portion of the release material layer 24. Thus, this square-shaped area of the release material layer 24 remains on the main label part Lo (the print label L) and covers the adhesive layer 22. As a result, when forming a cylindrical body around the cable 302 by wrapping the print label L around the cable 302 with the square-shaped release material layer 24 that covers the adhesive layer 22 positioned on the inside, as described above, the adhesive layer 22 in the cylindrical body can be prevented from adhering to the cable 302. Thus, the print label L can eb rotatably attached to the cable 302.

By using a portion of the release material layer 24 to suppress adhesion according to the structure described above, this structure does not degrade due to stress incurred while being wrapped around the object, changes in ambient conditions, or aging, as occurs in the conventional method of coating the adhesive layer 22 with varnish or other non-adhesive material. Thus, the adhesive layer 22 does not become exposed and does not impede rotation.

If the release material layer 24 were transparent and all other portions of the print label L were also transparent, the contents of the printed image R formed by the label-creating device 1 could be difficult to see depending on the color of the cable 302. The print label L in the present embodiment can suppress such adverse effects by using an opaque release material layer 24 having a composition that includes paper or colored film or fabric or metal.

A particular feature of the present embodiment is that the excess label portion LB is connected to the sides Lc and Ld of the main label part Lo (the print label L) through the perforated half-cuts HC. This configuration can suppress the main label part Lo (the print label L) from peeling off the release material layer 24 while being conveyed through the label-creating device 1 better than if the main label part Lo (the print label L) were fixed to the release material layer 24 without the excess label portion LB.

Another feature of the present embodiment is that a nontransparent release material layer 24 can be achieved by configuring the release material layer 24 of a composition that includes paper or colored film or fabric or metal.

<Variations>

The present disclosure is not limited to the embodiment described above but may be modified in various ways without departing from the spirit and technical concepts thereof. Such variations will be described below. In each of the following variations, parts equivalent to those in the present embodiment will be designated with the same reference numerals, and duplicate descriptions will be omitted or simplified as appropriate.

(1) Aligning the Longitudinal Direction of the Label with the Tape Length Direction <Printing Tape>

As shown in FIGS. 8A through 8D of this variation, as in the present embodiment described above, the main label parts Lo (or the print labels L having printed images R formed on the corresponding main label parts Lo) are arranged in series on the printing tapes To and T while separated from each other by the excess label portion LB (see FIG. 2A). Further, the base layer 21 is separated between the main label parts Lo and the excess label portion LB by the half-cuts HC and is fixed to the second side surface of the release material layer 24 in the thickness direction via the adhesive layer 22.

In this variation, the main label parts Lo or print labels L are arranged such that their longitudinal directions are aligned with the tape length direction of the printing tapes To and T. That is, a plurality of the slits S are provided in the release material layer 24 along the tape length direction, and a plurality of main label parts Lo or print labels L are fixed to the release material layer 24 along the tape length direction. The release material layer 24 is elongated in the tape length direction, which is parallel to the side Sc (described later) of each of the plurality of slits S. A plurality of sets that each comprise one slit S and one corresponding main label part Lo (print label L) is juxtaposed along this length direction.

Each main label part Lo has a length Wb in the tape width direction and three areas: the adhesive area D1, non-adhesive area D23, and adhesive area D4. The printing tapes To and T have a length Ws in the tape width direction that is greater than the length Wb of the main label part Lo in the tape width direction. As in the present embodiment described above, rectangular-shaped (square-shaped) slits S are provided in the release material layer 24, and the print background layers 25 are arranged so that at least a portion of each print background layer 25 overlaps at least a portion of the slit inner area SI enclosed by the corresponding slit S. In this example, the slits S overlap the print background layers 25 in a plan view. Further, as in the present embodiment, marks PM are provided on the release material layer 24 for positioning control when the printing tape To is conveyed. Each mark PM is provided in an intermediate part between two neighboring slits S, S (but in a plan view are positioned inside the main label part Lo or print label L, as illustrated in FIG. 8C and FIG. 8D). Also, as in the present embodiment, printed images R configured of the text "A01," "A02," and "A03" are formed on the print background layers 25 of the corresponding print labels L.

Figure 8A:
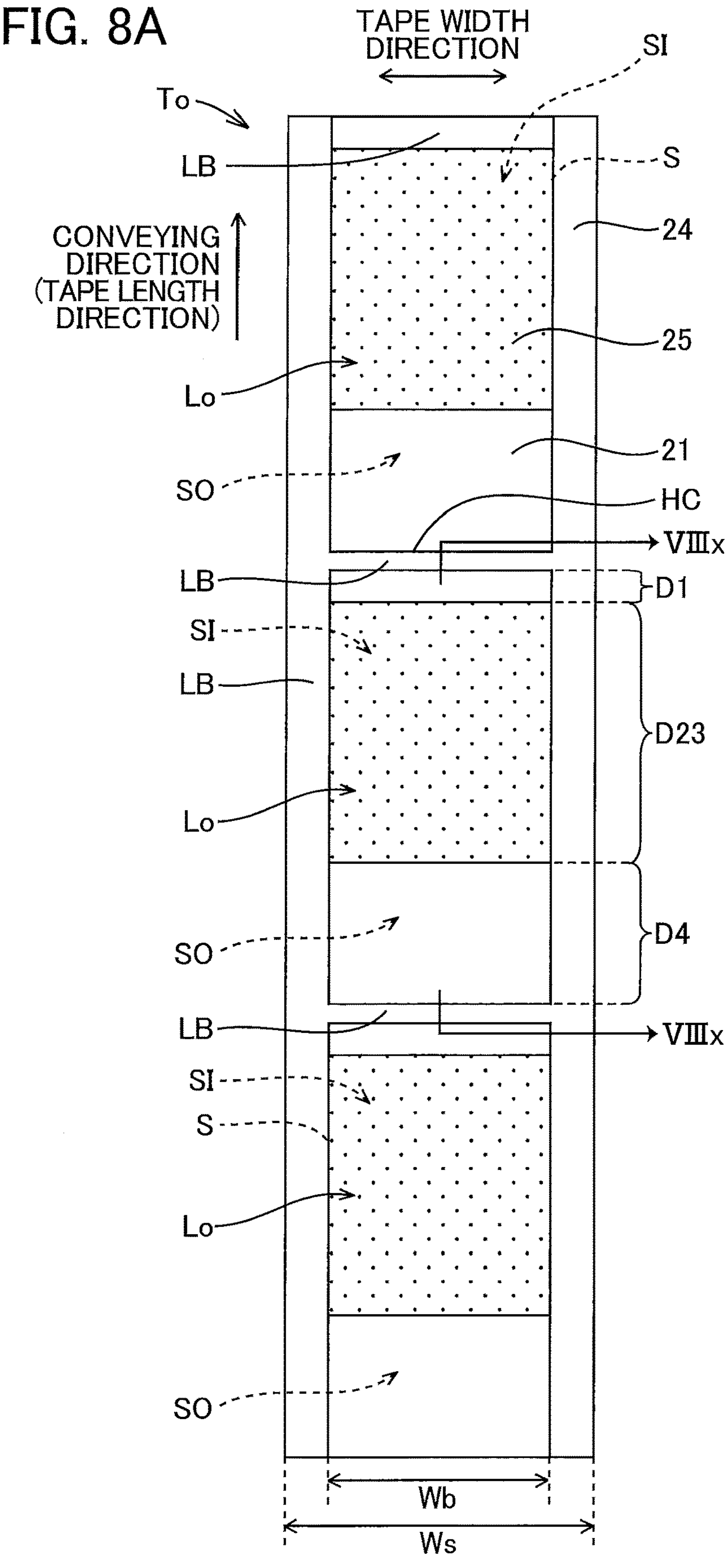
FIG. 8A is a plan view showing a printing tape in an unprinted state according to a variation aligning a longitudinal direction of a label with a tape length direction.
Figure 8B:
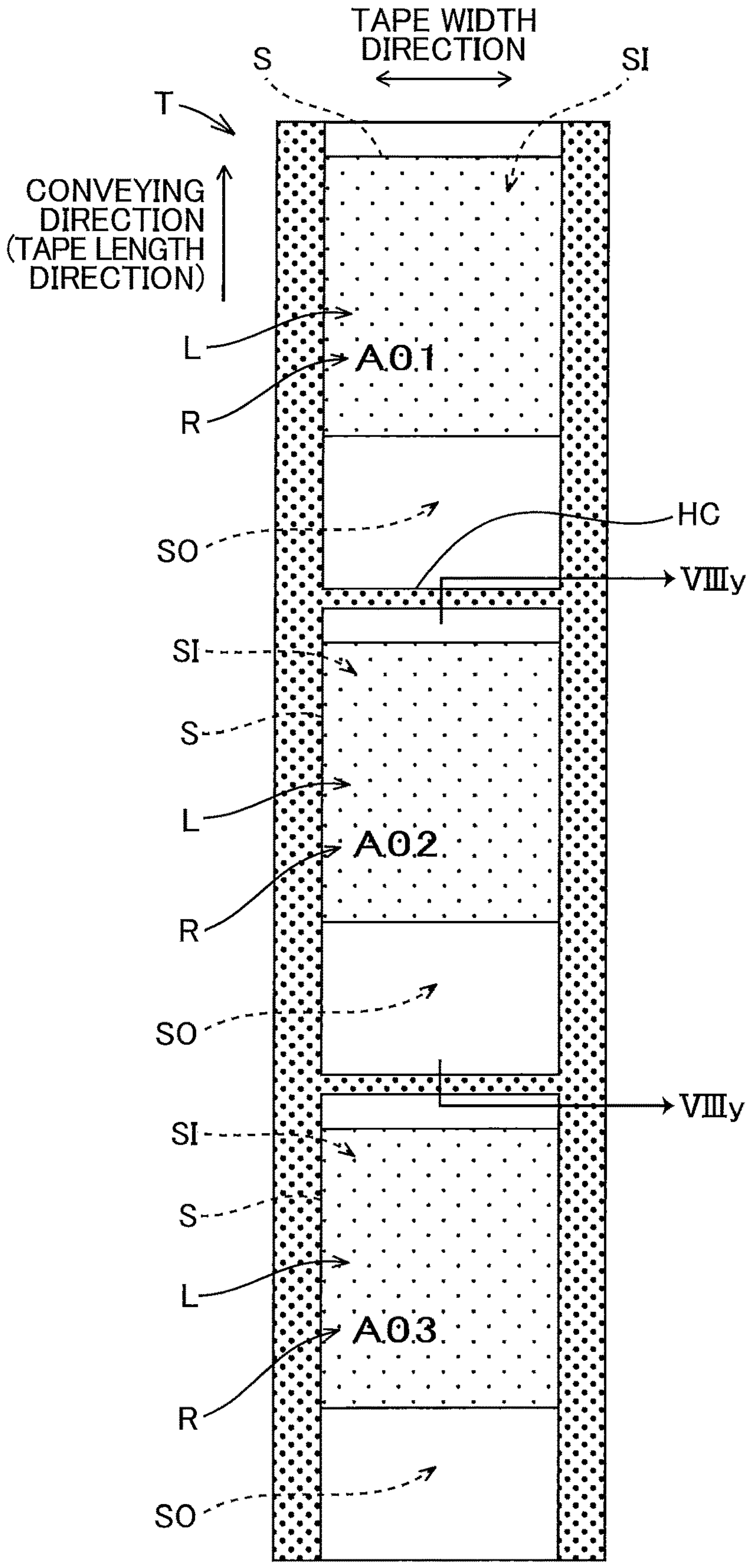
FIG. 8B is a plan view showing a printed printing tape after an excess label portion has been peeled off.
Figure 8C:
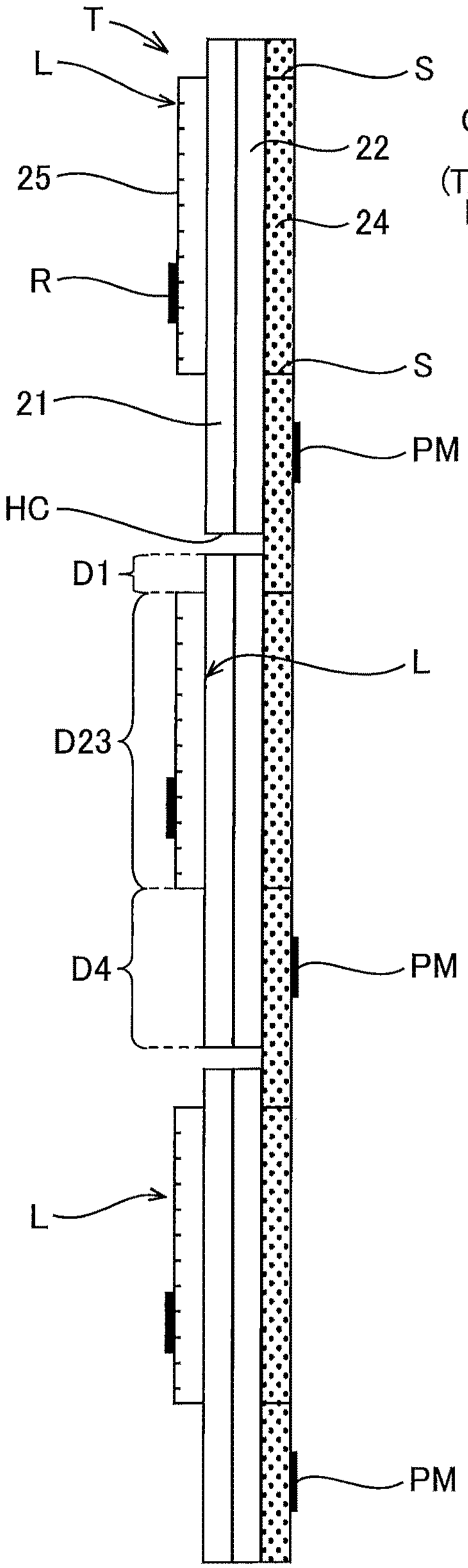
FIG. 8C is a side view of the structure shown in FIG. 8B.
Figure 8D:
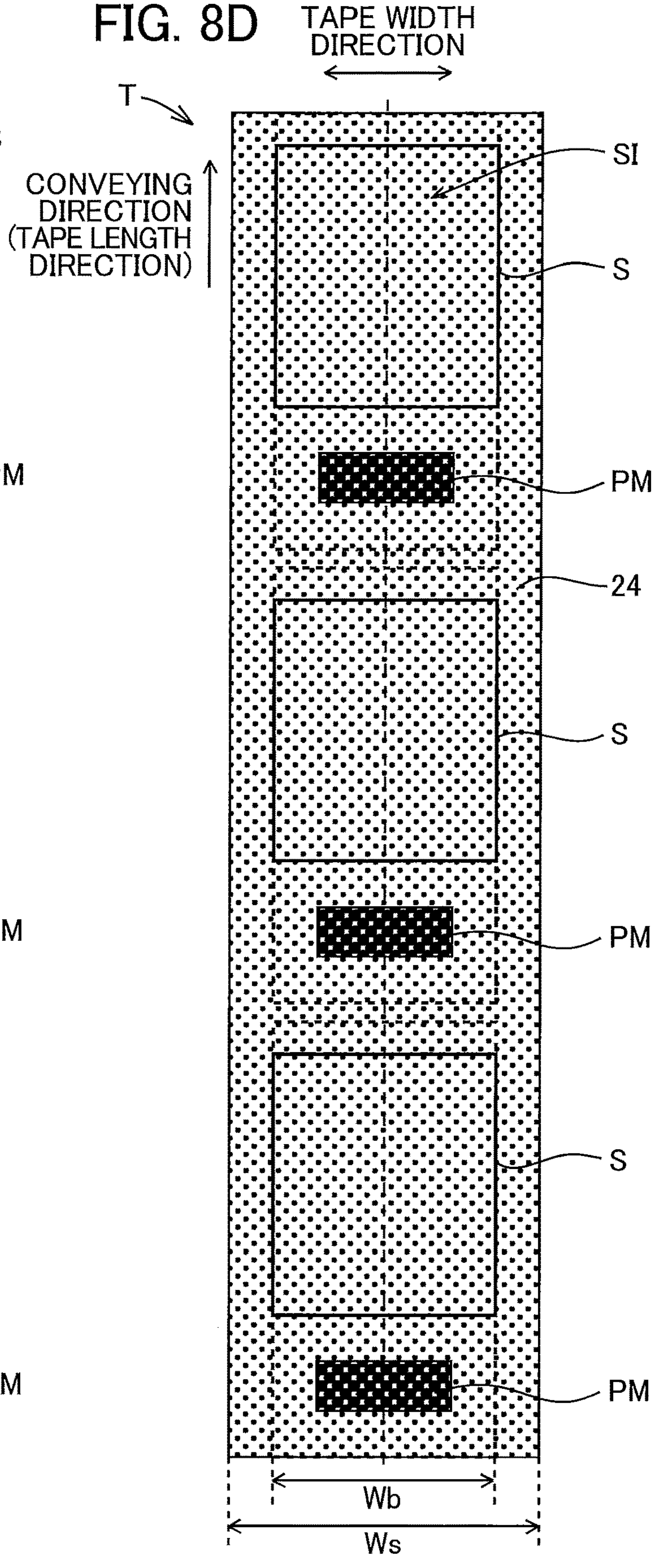
FIG. 8D is a rear view showing the printed printing tape.
Figure 8E:
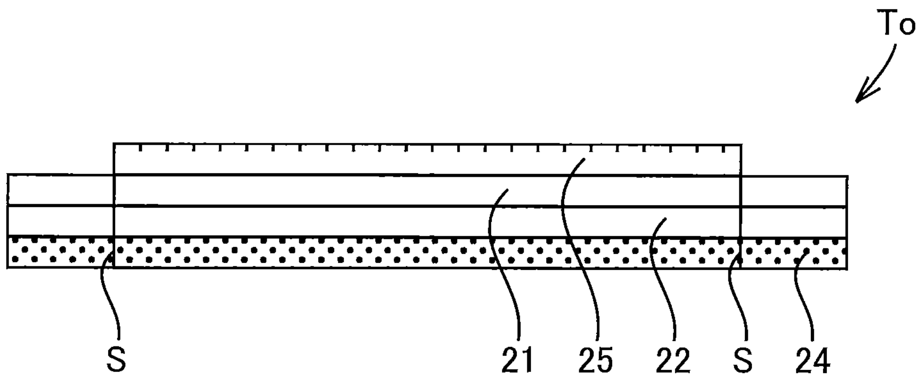
FIG. 8E is a cross-sectional view taken along a section VIIIx-XIIIx of the structure shown in FIG. 8A.
Figure 8F:
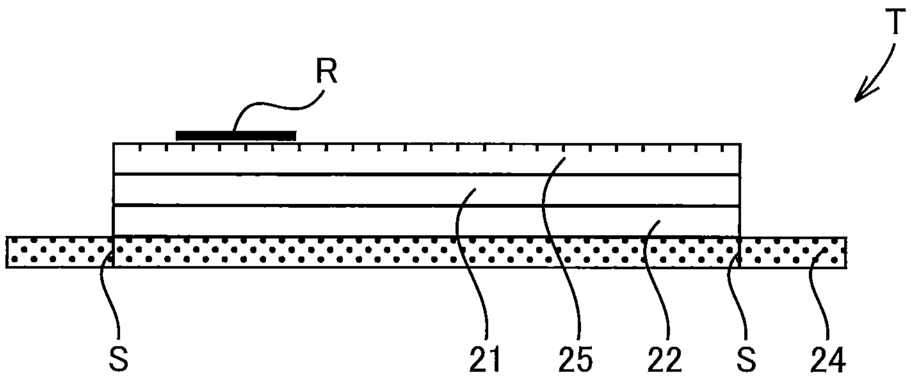
FIG. 8F is a cross-sectional view taken along a section VIIIy-VIIIy of the structure shown in FIG. 8B.
Figure 9A:
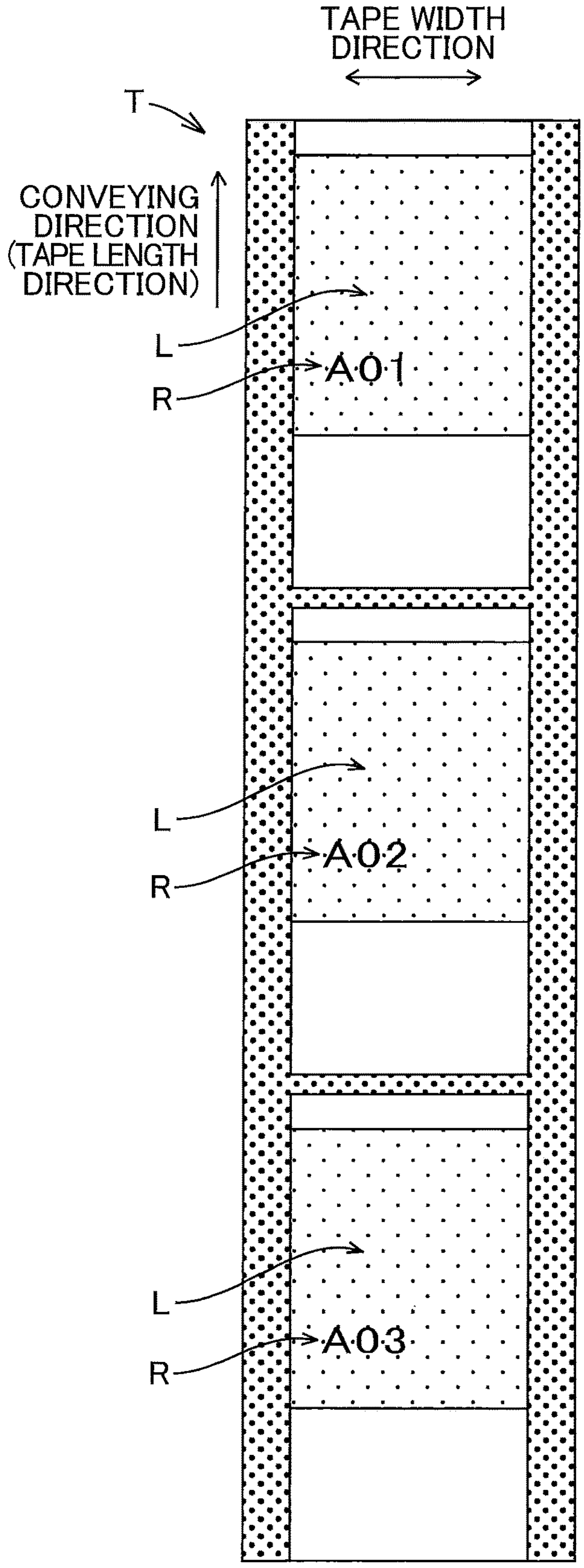
FIG. 9A is a plan view showing the printed printing tape.
Figure 9B:
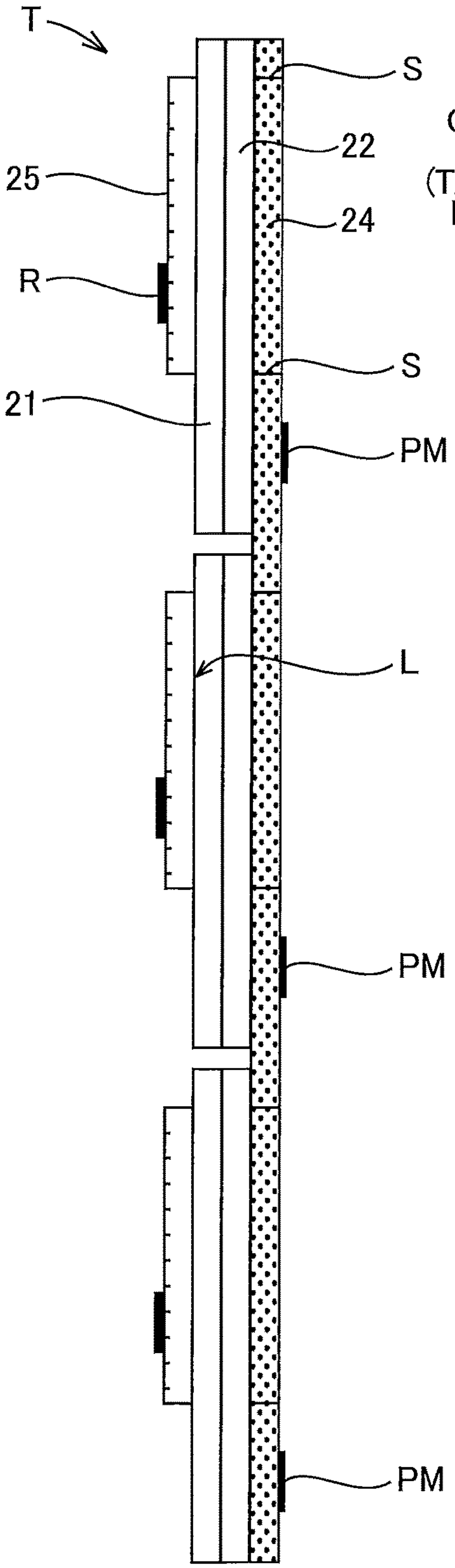
FIG. 9B is a side view showing the structure shown in FIG. 9A.
Figure 9C:
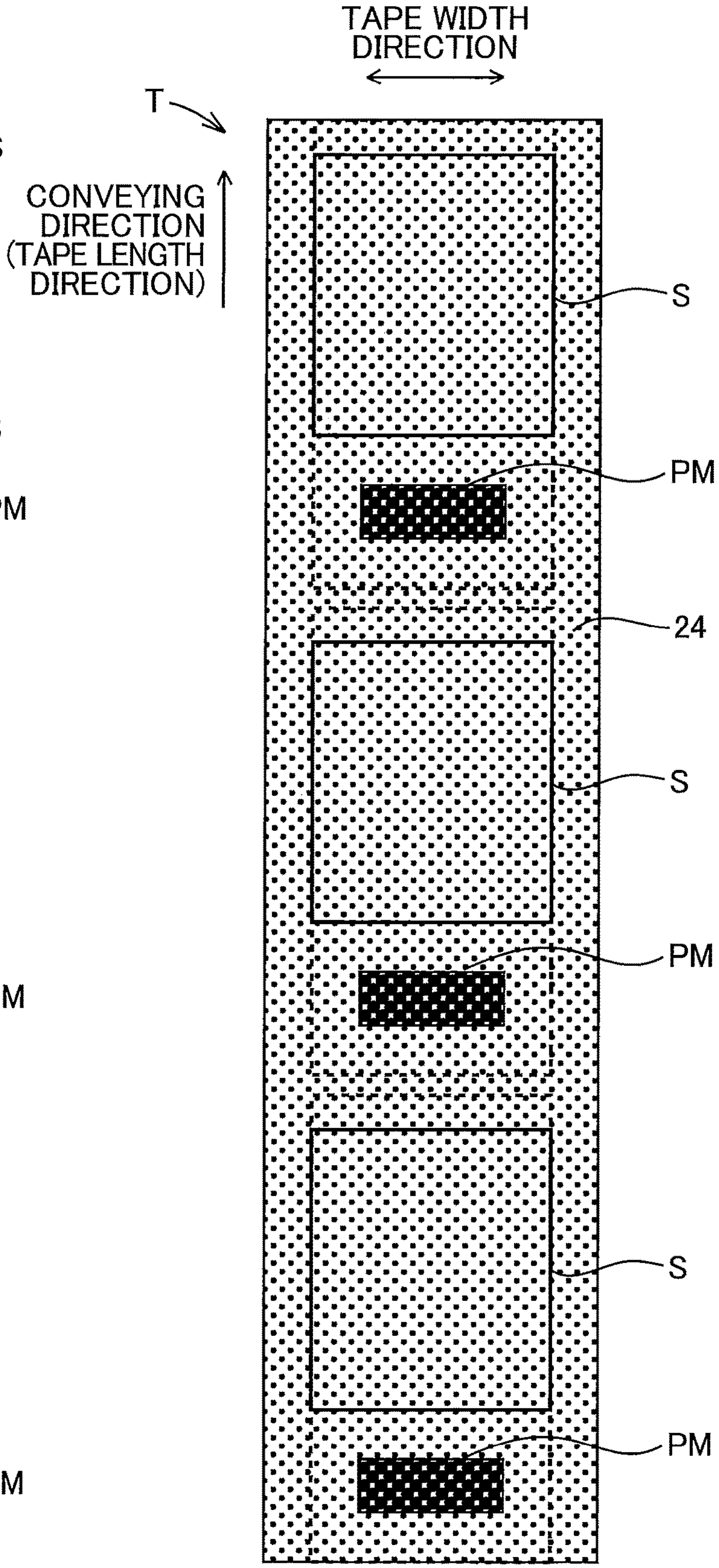
FIG. 9C is a rear view showing the printed printing tape.
Figure 9D:
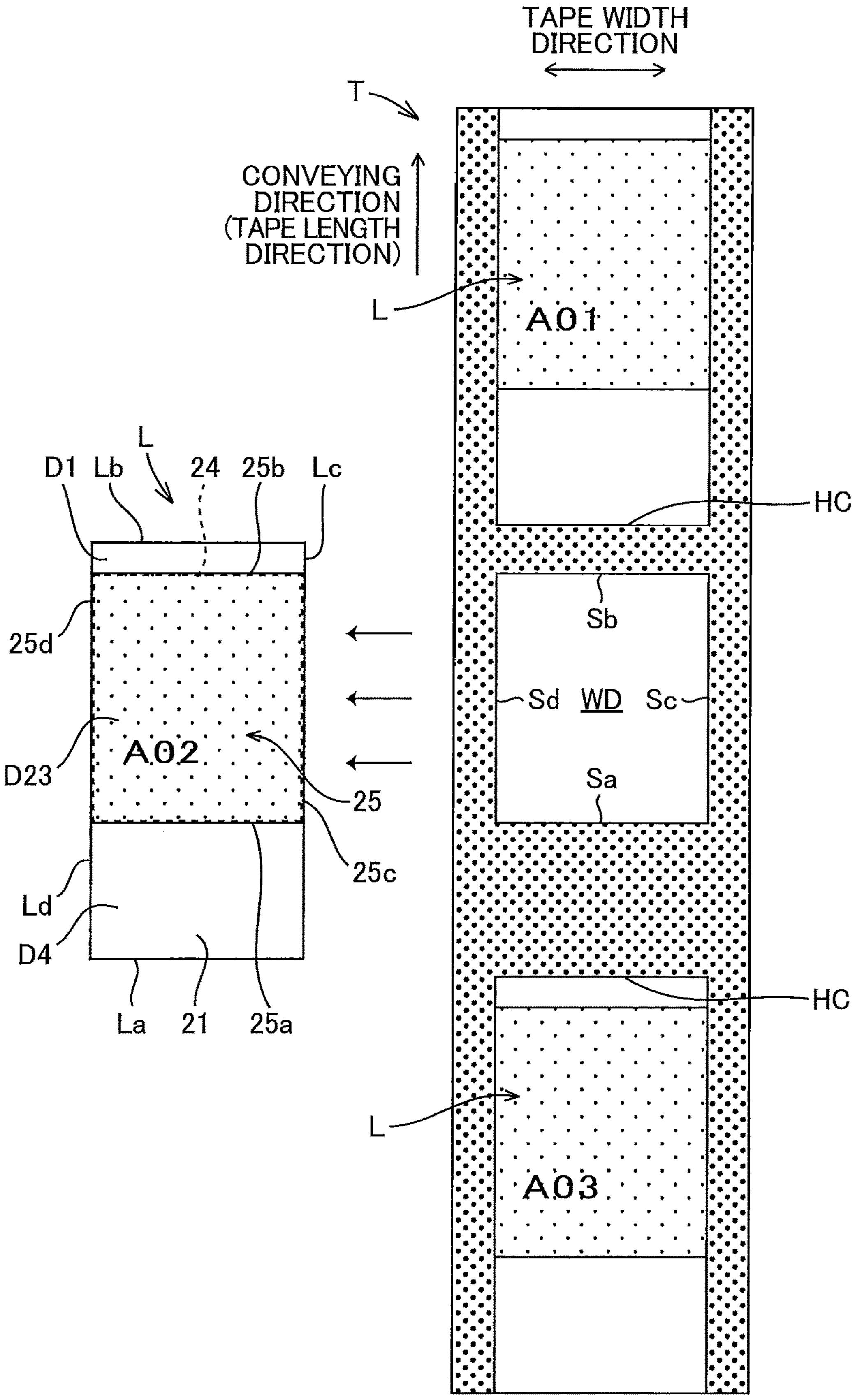
FIG. 9D is a plan view showing a state of the printed printing tape after single print label has been peeled off.

As in the present embodiment described above, with the printing tapes To and T of this variation, first the excess label portion LB is separated from the main label parts Lo and the release material layer 24 (see FIG. 8B and FIG. 9A) by peeling the excess label portion LB from the top surface of the release material layer 24, as shown in FIG. 8A. Note that a printing tape To may be provided with an initial configuration that omits the excess label portion LB from FIG. 8A (i.e., a configuration that omits the printed images R from FIG. 8B). Next, owing to the square-shaped slits S described above, each print label L having a printed image R formed on the print background layer 25 can be peeled off while the square-shaped portion of the release material layer 24 positioned inside the slit S remains covering the release material layer 24, as illustrated in FIG. 9D. After the print label L has been peeled off, a space (a window WD) will remain on the strip-like release material layer 24 inside the rectangular slit S, as illustrated in FIG. 9F.

Figure 9E:
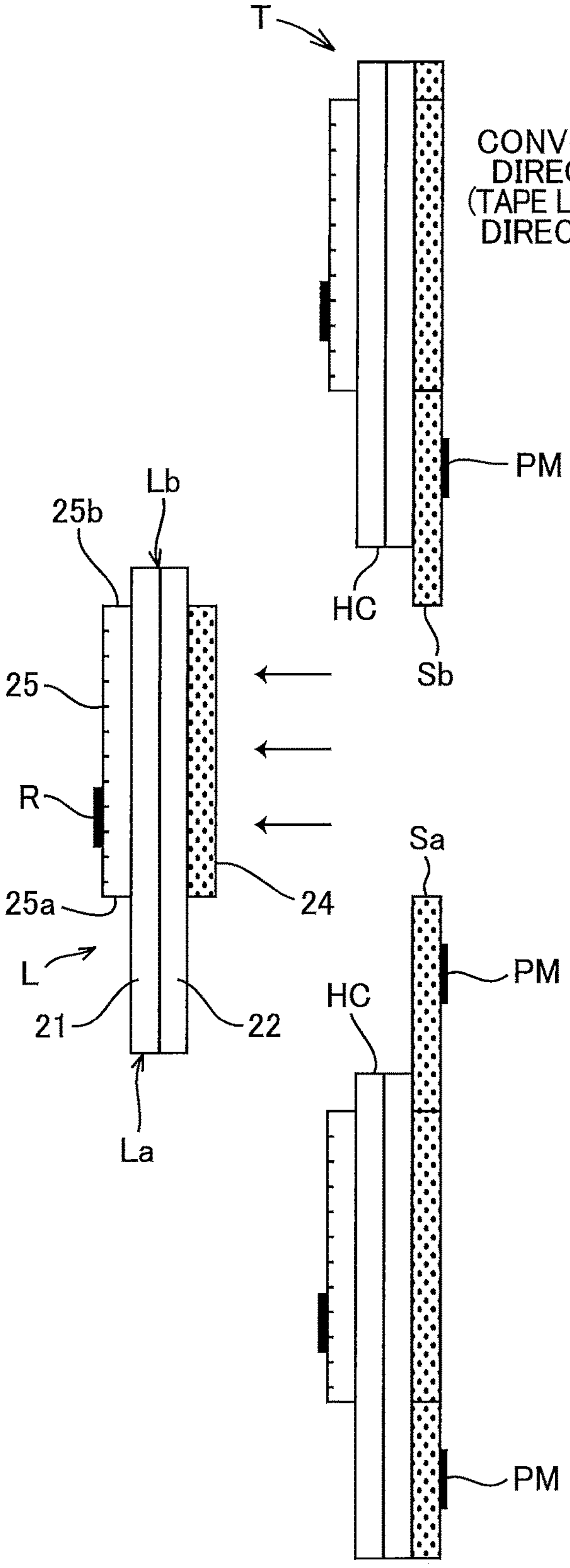
FIG. 9E is a side view showing the structure shown in FIG. 9D.
Figure 9F:
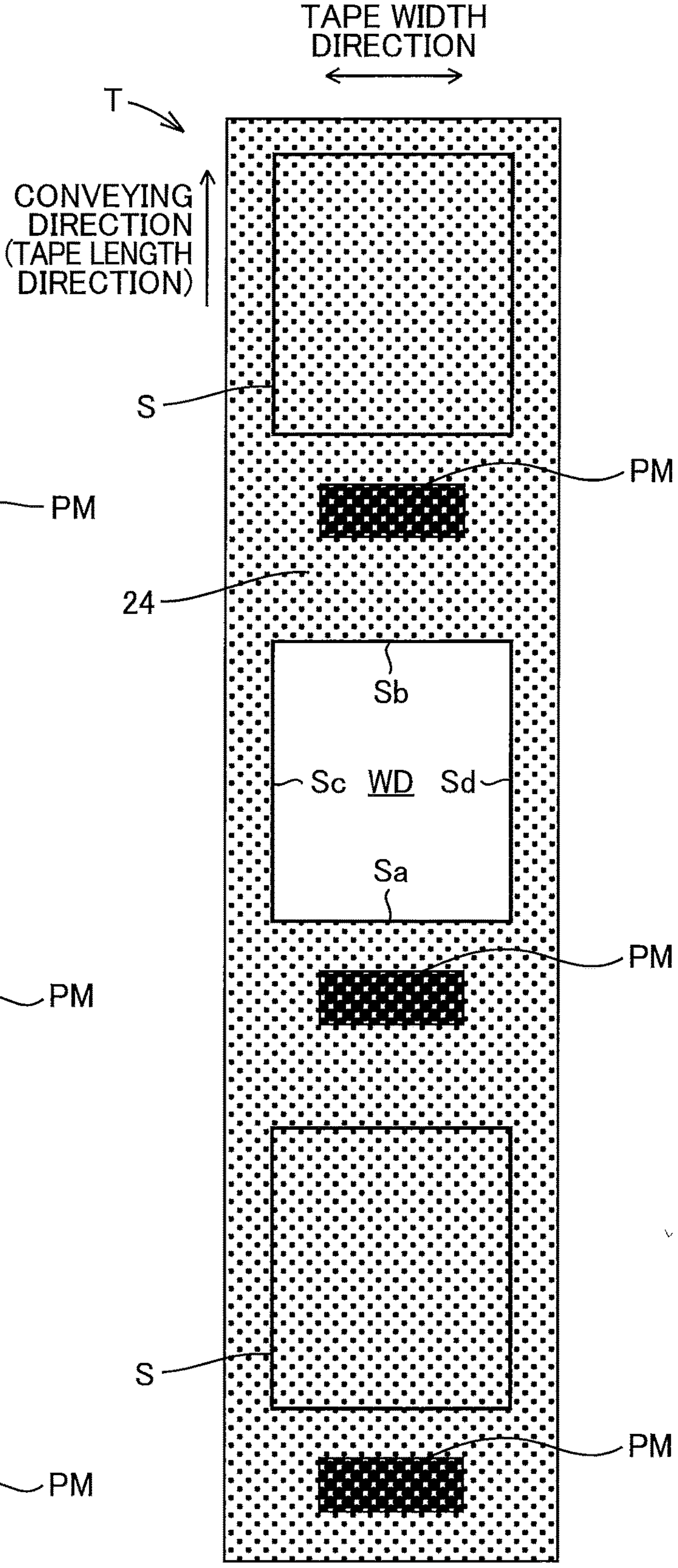
FIG. 9F is a rear view of the printing tape after the print label has been peeled off.
Figure 10A:
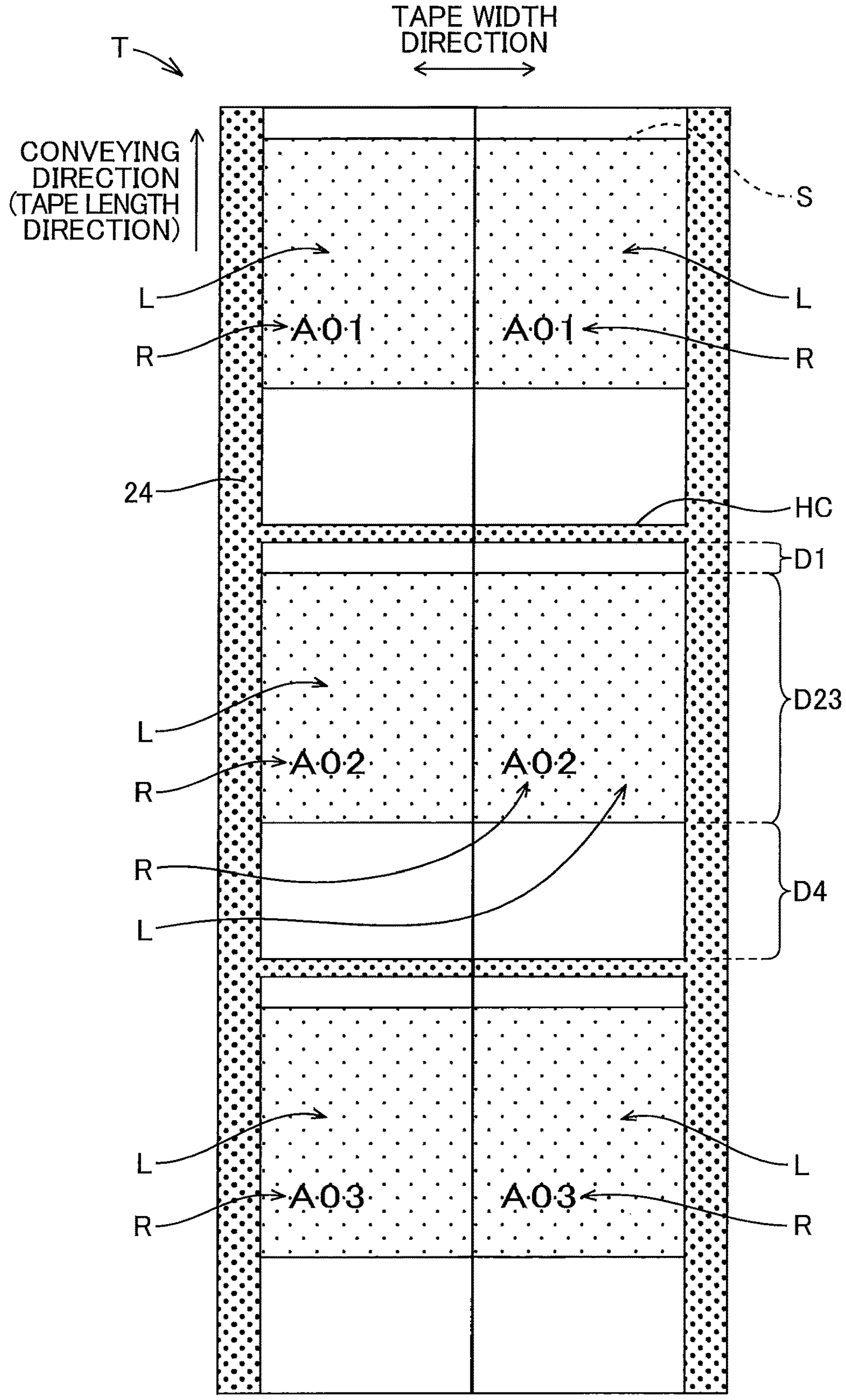
FIG. 10A is a plan view showing a printing tape in an unprinted state according to a variation in which a plurality of columns of main label parts (print labels) is arranged in a tape width direction.
Figure 10B:
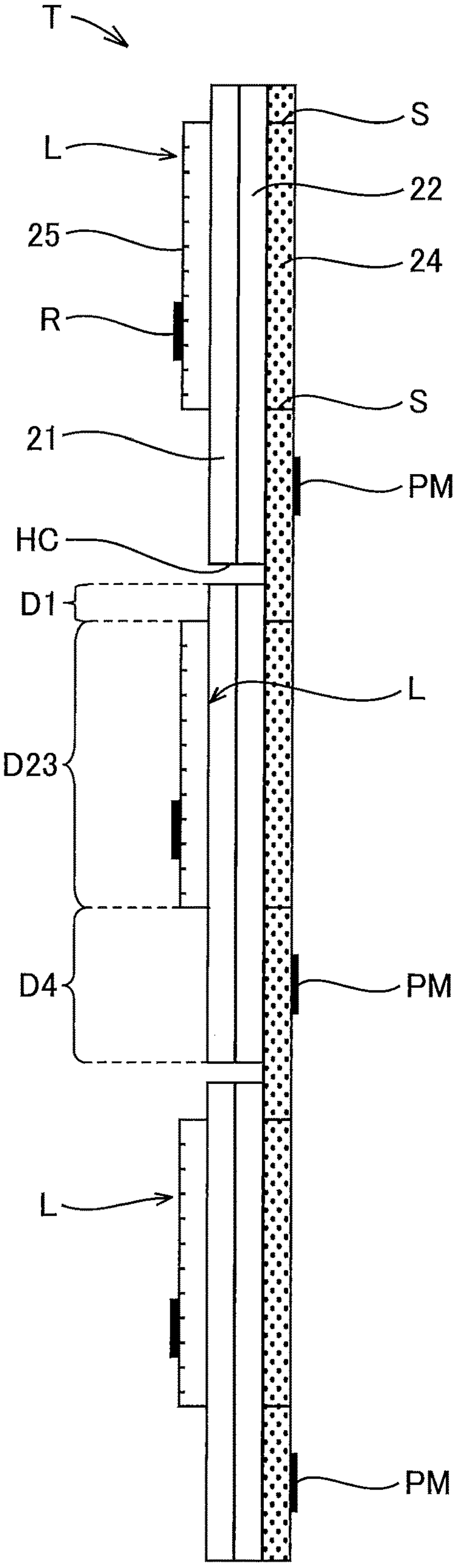
FIG. 10B is a side view showing the structure shown in FIG. 10A.
Figure 10C:
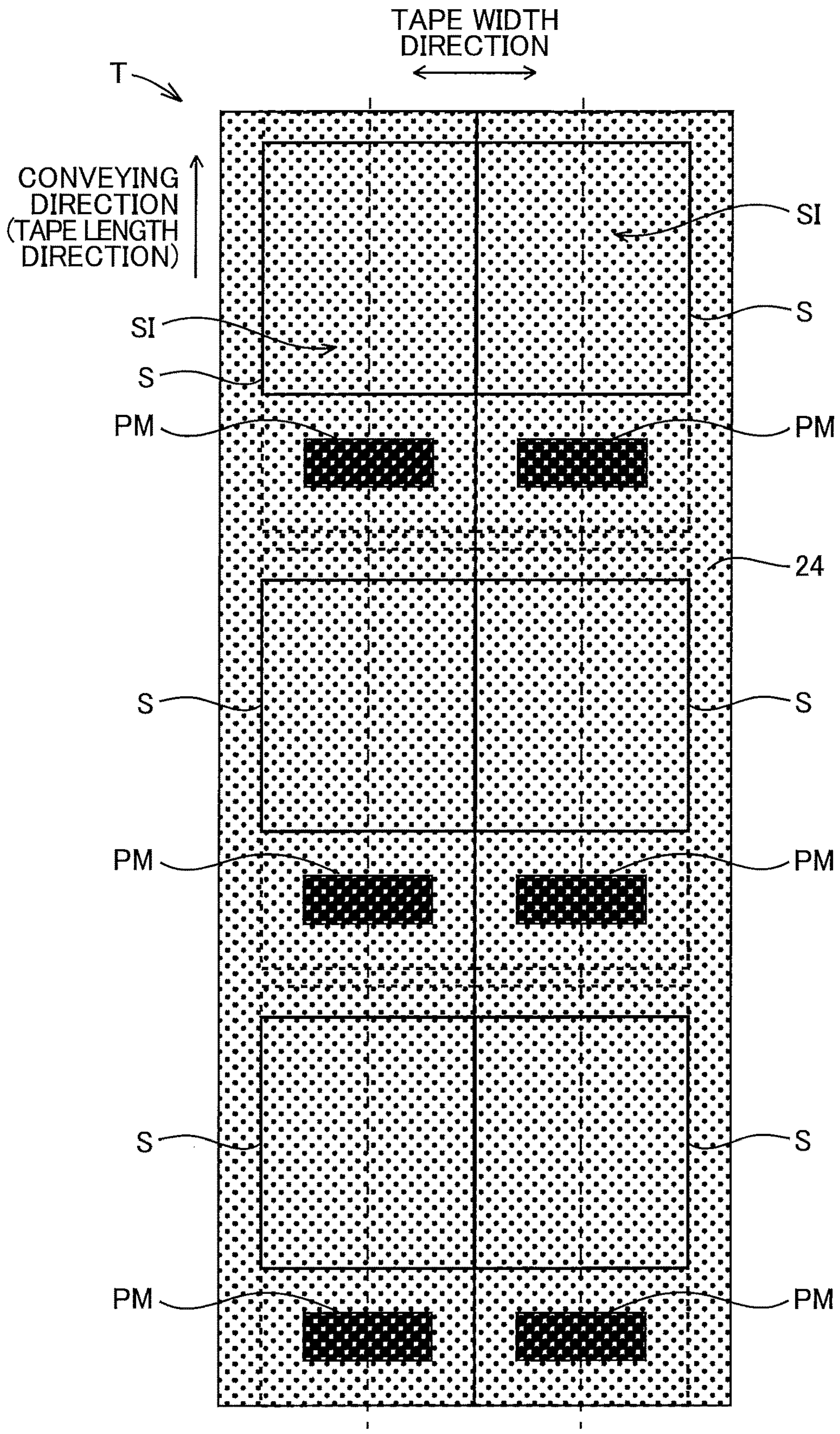
FIG. 10C is a rear view showing the structure shown in FIG. 10A.
Figure 10D:
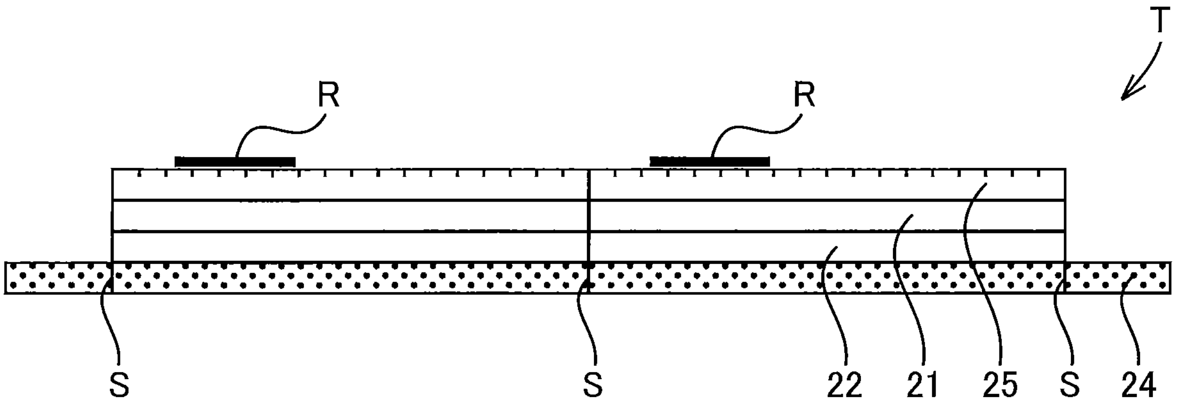
FIG. 10D is a cross-sectional view of the structure shown in FIG. 10A.

As in the present embodiment described above, each slit S has opposing sides configured of a side Sa (corresponding to the first side) and a side Sb (corresponding to the second side) and opposing sides configured of a side Sc (corresponding to the third side) and a side Sd (corresponding to the fourth side), as illustrated in FIGS. 9D through 9F. The main label part Lo (print label L) is fixed to the release material layer 24 so as to span across both the side Sa and the side Sb of the corresponding slit S (see FIGS. 9D through 9F). In accordance with the above structure, the print background layer 25 is formed in a square shape having the side 25*a* (corresponding to the ninth side), the side 25*b* (corresponding to the tenth side), the side 25*c* (corresponding to the eleventh side), and the side 25*d* (corresponding to the twelfth side). In accordance with this structure, the main label part Lo is formed in a square shape having opposing sides configured of a side La (corresponding to the fifth side) and a side Lb (corresponding to the sixth side) and opposing sides configured of a side Lc (corresponding to the seventh side) and a side Ld (corresponding to the eighth side). The excess label portion LB described above is connected to the sides Lc and Ld and the sides La and Lb of the main label part Lo through the perforated half-cuts HC. Note that slits similar to the slits S described above may be provided in place of the perforated half-cuts HC only between the excess label portion LB and the sides La and Lb of the main label part Lo. However, in this case the printing tape To must be provided with the excess label portion LB described above. Also as described above, the print background layer 25 may be smaller than the slit inner area SI enclosed in the corresponding slit S.

In this variation, the dimensional relationship among the main label parts and the slits and the structure of the print label L that is produced are similar to those in the embodiment and, hence, a description will not be repeated here.

The present variation can obtain the same effects described in the present embodiment.

In the structures of the present embodiment described above and the variation (1) thereof, a plurality of sets, each comprising one slit S and one corresponding main label part Lo (print label L), is provided on the release material layer 24. The sets are arranged discretely on the release material layer 24 at intervals in the tape length direction (with the excess label portion LB present between sets), but variation (1) is not limited to this configuration. That is, sets of slits S and main label parts Lo (print labels L) may be arranged adjacent to each other (with no gaps therebetween) on the release material layer 24. This structure can also obtain the same effects described above.

As illustrated in FIG. 10A, FIG. 10B, FIG. 10C, and FIG. 10D that correspond to FIG. 8B, FIG. 8C, FIG. 8D, and FIG. 8F described above, the length of the release material layer 24 may be widened in the tape width direction, and a plurality of columns (two columns in this example) of main label parts Lo (print labels L) may be arranged on the release material layer 24 adjacent to each other in the tape width direction. In other words, a plurality of label bodies may be arranged along the tape length direction. Each label body has a plurality of sets (two sets in this example), each comprising a slit S and a main label part Lo (print label L), arranged adjacent to each other in the tape width direction. This variation can also obtain the same effects described above.

(2) Using Tape of the Continuous Length Type

In this variation, a printing tape To without the half-cuts HC described above (known as a continuous length type) is wound into the tape roll 10A and accommodated in the tape cartridge 10.

FIGS. 11A through 11E show a detailed structure of the printing tapes To and T in this variation.

Figure 11A:
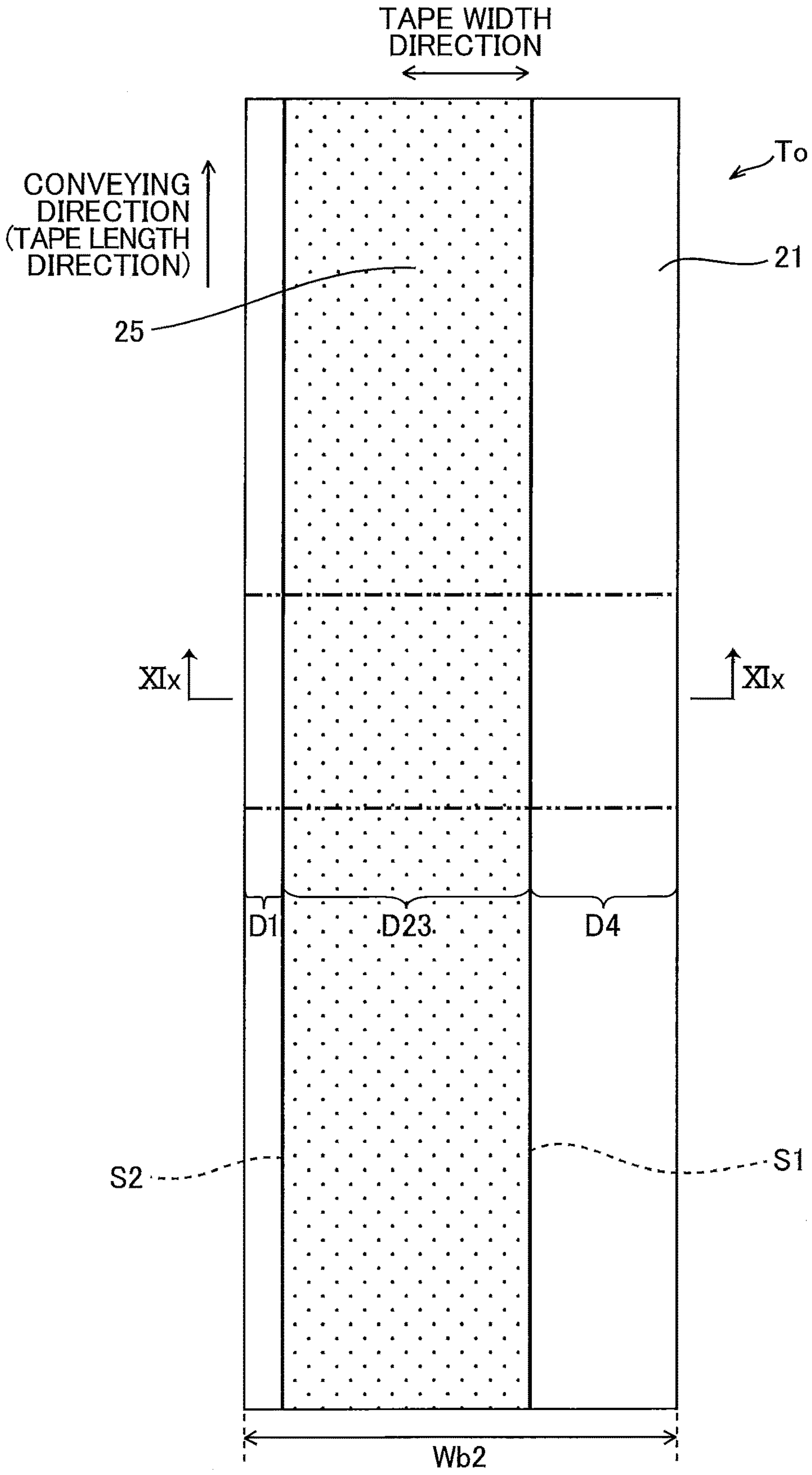
FIG. 11A is a plan view showing a printing tape in an unprinted state according to a variation using a tape of a continuous length type.
Figure 11B:
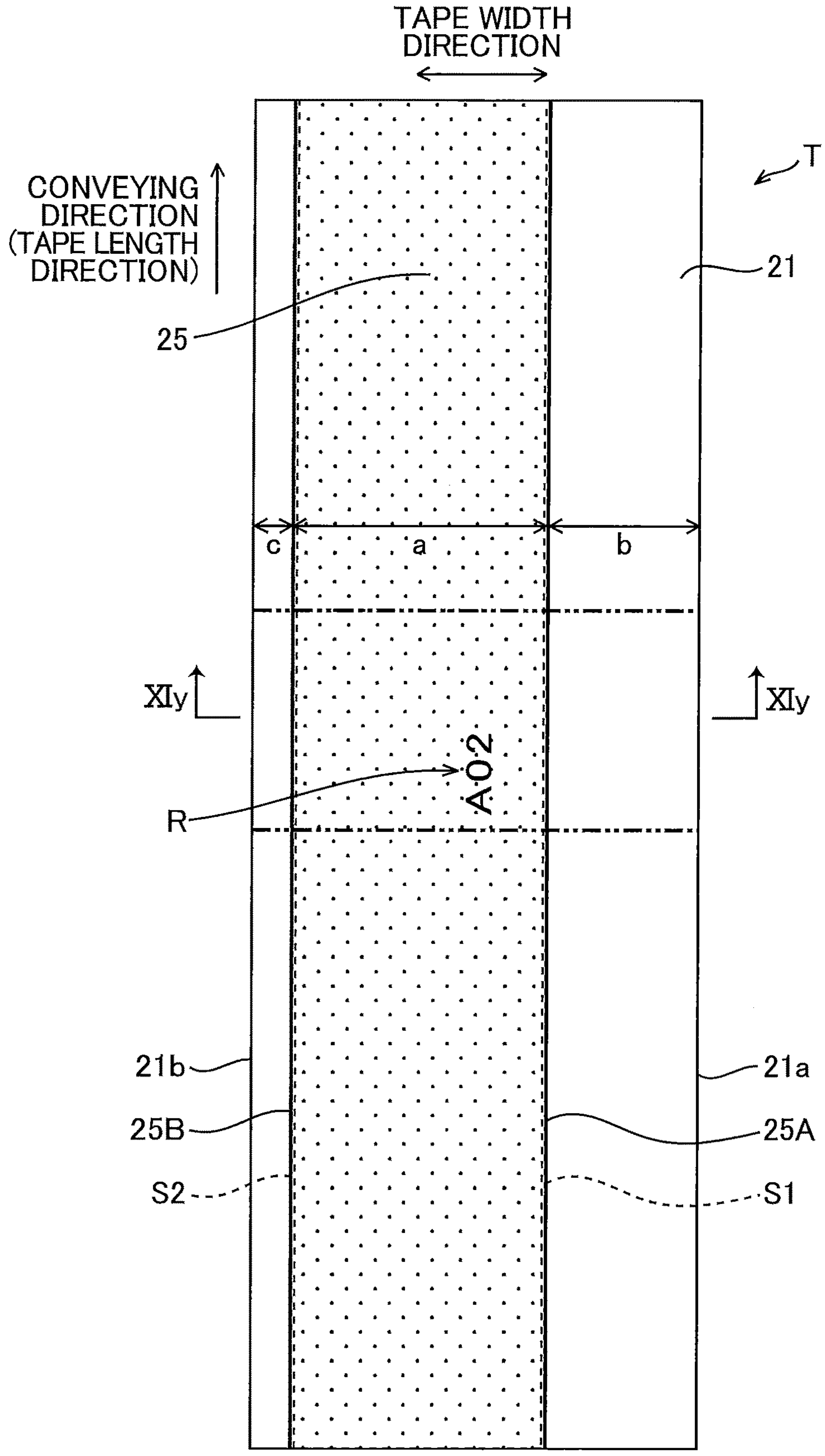
FIG. 11B is a plan view showing a printed printing tape.
Figure 11C:
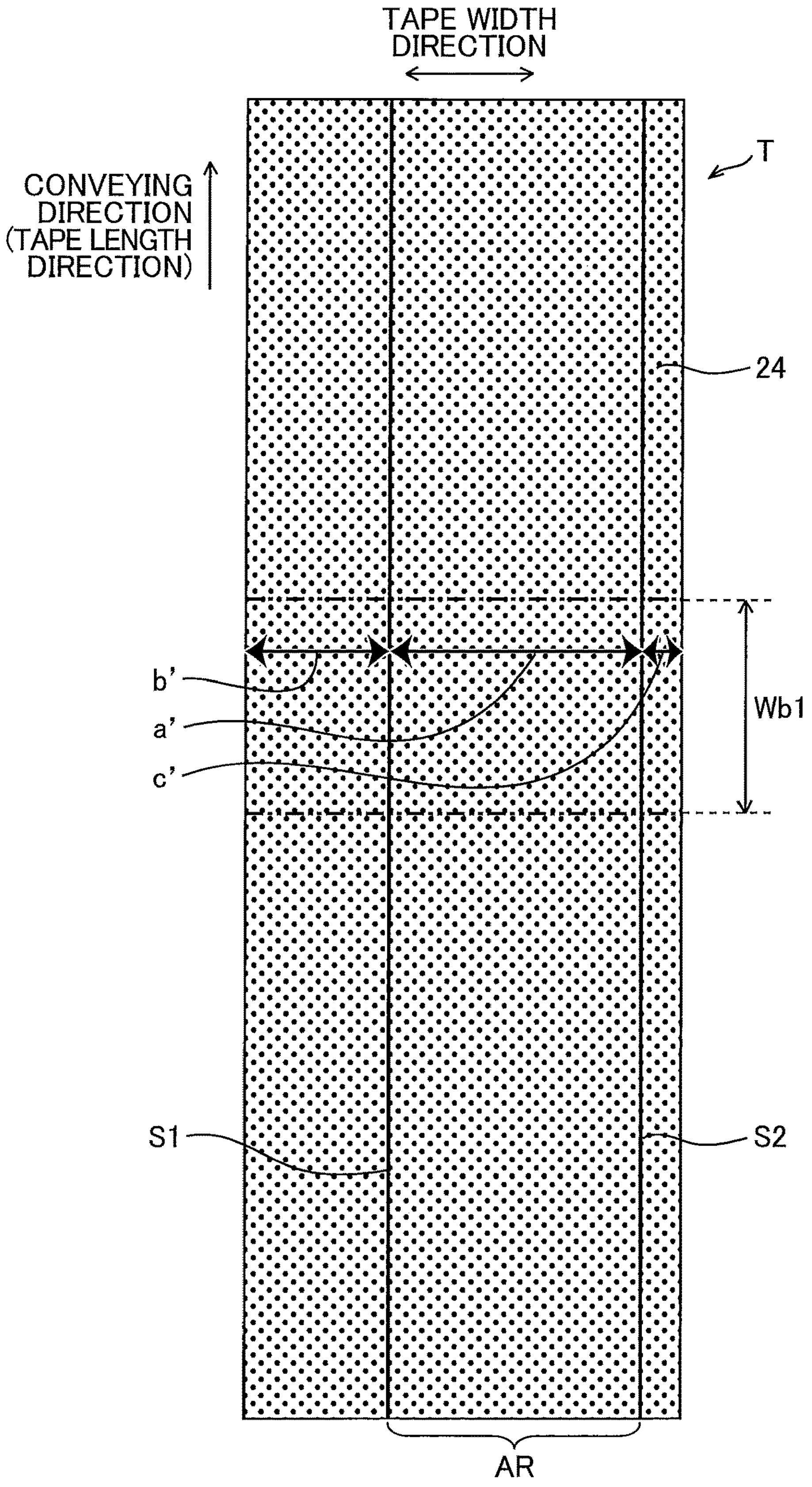
FIG. 11C is a rear view shoeing the printed printing tape.
Figure 11D:
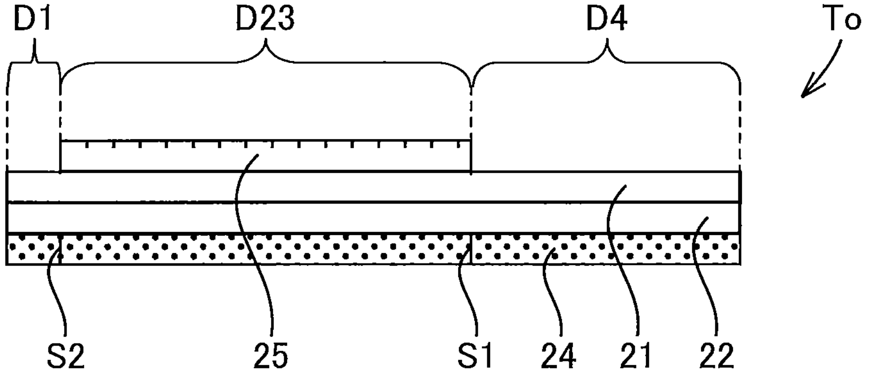
FIG. 11D is a cross-sectional view showing the structure shown in FIG. 11A.
Figure 11E:
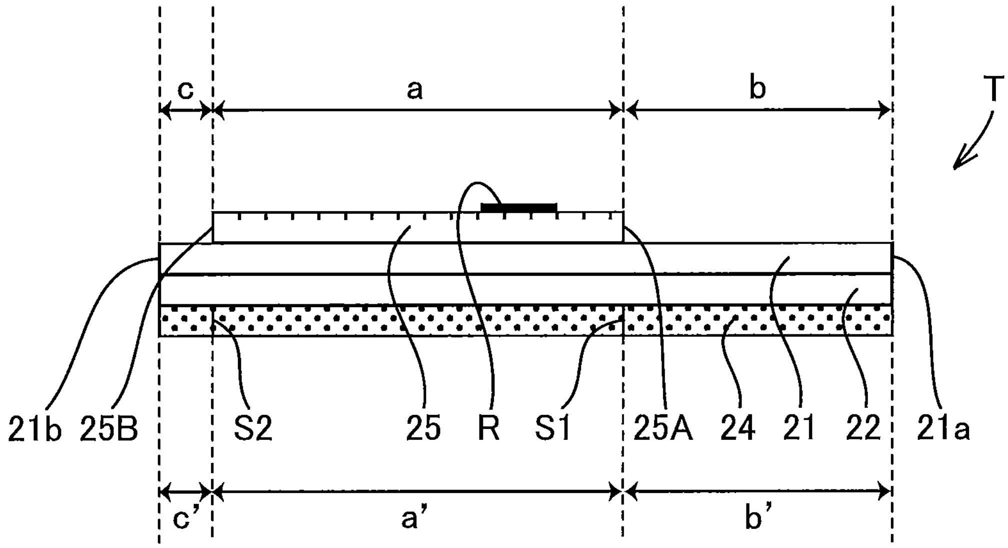
FIG. 11E is a cross-sectional view showing the structure shown in FIG. 11B.

FIG. 11A is a plan view of an unprinted printing tape To; FIG. 11B is a plan view of the printing tape T after the printed image R has been printed; FIG. 11C is a rear view of the printed printing tape T; FIG. 11D is a cross-sectional view taken along the section XIx-XIx in the structure shown in FIG. 11A; and FIG. 11E is a cross-sectional view taken along the section XIy-XIy in the structure shown in FIG. 11B.

As described above, the printing tapes To and T include an opaque release material layer 24 (corresponding to the release material layer), a transparent adhesive layer 22 (corresponding to the adhesive layer), and a transparent base layer 21 having compositions that include paper or colored film or fabric or metal, as shown in FIGS. 11A through 11E. The release material layer 24, adhesive layer 22, and base layer 21 are layered in sequence from a first side of the thickness direction (the bottom in FIG. 11D and FIG. 11E, the far side in FIG. 11A and FIG. 11B, and the near side in FIG. 11C) toward a second side of the thickness direction (the top in FIG. 11D and FIG. 11E, the near side in FIG. 11A and FIG. 11B, and the far side in FIG. 11C). The base layer 21 is fixed to the surface of the release material layer 24 on the second side in the thickness direction via the adhesive layer 22.

As described above, the adhesive layer 22 may be provided in part, rather than over the entire surface, on the back side of the base layer 21, i.e., between the base layer 21 and release material layer 24. A print background layer 25 (corresponding to the printing layer) is also partially provided on the front-side (the top in FIG. 11D and FIG. 11E) surface of the base layer 21. The print background layer 25 has a suitable nontransparent color and the printed image R formed by the print head 7. The print background layer 25 is a rectangular-shaped layer having an edge 25A (corresponding to the first edge) on one side (the right side in FIG. 11B), and an edge 25B (corresponding to the second edge) on the other side (the left side in FIG. 11B). The length of the printing tapes To and T in the tape width direction is the Wb2 described above.

A plurality of slits is provided in the release material layer 24. The slits extend linearly in the tape length direction (corresponding to the first direction) from one short side of the rectangular release material layer 24 (the bottom in FIG. 11C) to the other short side (the top in FIG. 11C). In this example, the release material layer 24 is provided with two slits, and specifically a slit S1 (corresponding to the first slit), and a slit S2 (corresponding to the second slit). In this case, the base layer 21 is fixed to the release material layer 24 via the adhesive layer 22 so as to span across both the slit S1 and the slit S2.

Here, the print background layer 25 is disposed so that at least a portion of the print background layer 25 overlaps at least a portion of the inter-slit area AR enclosed by the slits S1 and S2. The dimension of the print background layer 25 in the tape width direction is equal to or smaller than the same dimension of the inter-slit area AR. In this example, the print background layer 25 and the inter-slit area AR have the same length in the tape width direction, and the entirety of the print background layer 25 overlaps the inter-slit area AR. In other words, the inter-slit area AR overlaps the print background layer 25 in a plan view. In this example, the printed images R formed on the print background layer 25 of the printing tape T comprise print objects including the text "A01," "A02," "A03," The base layer 21, adhesive layer 22, and print background layer 25 correspond to the print label layer in the claims.

As shown in FIG. 11B, FIG. 11C, and FIG. 11D, one edge 21*a* on one side (the right side in the drawings) of the base layer 21 is on the side closer to the slit S1 than the slit S2, and another edge 21*b* on another side (the left side in the drawings) of the base layer 21 is on the side closer to the slit S2 than the slit S1. Further, the shortest distance b' between the slit S1 and the one edge 21*a* on the one side of the base layer 21 is greater than the shortest distance c' between the slit S2 and the other edge 21*b* on the other side of the base layer 21, and the shortest distance a' between the slit S1 and slit S2 is between one and three times the shortest distance b' between the slit S1 and the one edge 21*a* on the one side of the base layer 21.

Further, the one edge 21*a* on the one side of the base layer 21 is on the side closer to the edge 25A than the edge 25B of the print background layer 25, and the other edge 21*b* on the other side of the base layer 21 is on the side closer to the edge 25B than the edge 25A of the print background layer 25. Further, the shortest distance b between the edge 25A of the print background layer 25 and the one edge 21*a* on the one side of the base layer 21 is greater than the shortest distance c between the edge 25B of the print background layer 25 and the other edge 21*b* on the other side of the base layer 21, and the shortest distance a between the edge 25A and edge 25B of the print background layer 25 is between one and three times the shortest distance b between the edge 25A of the print background layer 25 and the one edge 21*a* on the one side of the base layer 21.

As described earlier, the layered structure for the printing tapes To and T described above has three regions, i.e., the adhesive area D1, the non-adhesive area D23 provided adjacent to the adhesive area D1 and corresponding to the print background layer 25, and the adhesive area D4 provided adjacent to the non-adhesive area D23. By cutting the printing tape T with the cutter 9 after the printing tape T has been printed, the label-creating device 1 can obtain a print label L having the width Wb1 in the tape length direction (depicted with two-dot chain lines in FIGS. 11A and 11B) and substantially the same structure as described in the preferred embodiment and variation (1) (i.e., a structure similar to that in FIGS. 4A and 4B). Accordingly, this variation can obtain the same effects described above.

(3) Other Variations

When dimensions and sizes are described as being "identical," "equivalent," "different," and the like in appearance in the above description, these terms are not intended to be taken in their strictest sense. In other words, the terms "identical," equivalent," and different" may signify "substantially identical," "substantially equivalent," and "substantially different" to allow for design and manufacturing tolerances and error.

The arrows shown in FIG. 1 indicate an example of the signal flow in the above description, but the directions of signal flow are not limited to this example.

In addition to what has already been described, the methods according to the present embodiment and its variations may be used in suitable combinations.

In addition, although not illustrated individually, the present disclosure may be implemented with various modifications without departing from the spirit of the disclosure.

What is claimed is:

1. A medium to be mounted in and to be printed with a printer, the medium comprising:

a release material layer having a rectangular shape including a first short side on one side in a first direction and a second short side on another side in the first direction;

at least two slits parallel to each other, each of the at least two slits extending in the first direction from the first short side to the second short side of the release material layer; and a print label layer comprising:

a printing layer on which an image is formed; and a base layer fixed to the release material layer so as to span across the at least two slits, the base layer being arranged between the release material layer and the printing layer in a layering direction, the base layer being transparent, wherein the at least two slits include a first slit and a second slit; and wherein each of the at least two slits extends continuously from the first short side to the second short side.

2. The medium according to claim 1, wherein the print label layer has one edge on one side and another edge on another side, the one edge being on a side closer to the first slit than the second slit, the other edge being on a side closer to the second slit than the first slit, wherein a shortest distance between the first slit and the one edge of the print label layer is greater than a shortest distance between the second slit and the other edge of the print label layer, and wherein a shortest distance between the first slit and the second slit is equal to or greater than the shortest distance between the first slit and the one edge of the print label layer and is equal to or smaller than three times the shortest distance between the first slit and the one edge of the print label layer.

3. The medium according to claim 2, wherein the printing layer has a rectangular shape including a first edge and a second edge, the first edge and the second edge opposing each other, the printing layer being arranged with at least a portion of the printing layer overlapping at least a portion of an area enclosed by the first slit and the second slit, wherein the one edge of the print label layer is on a side closer to the first edge of the printing layer than the second edge of the printing layer, wherein the other edge of the print label layer is on a side closer to the second edge of the printing layer than the first edge of the printing layer, wherein a first distance is greater than a second distance, the first distance being a shortest distance between the first edge of the printing layer and the one edge of the print label layer, the second distance being a shortest distance between the second edge of the printing layer and the other edge of the print label layer, and wherein a third distance is equal to or greater than the first distance and is equal to or smaller than three times the first distance, the third distance being a shortest distance between the first edge of the printing layer and the second edge of the printing layer.

4. The medium according to claim 1, wherein the printing layer has a dimension in a second direction same as a dimension in the second direction of an area enclosed by the first slit and the second slit, the second direction being orthogonal to the first direction.

5. The medium according to claim 1, wherein the printing layer has a dimension in a second direction smaller than a dimension in the second direction of an area enclosed by the first slit and the second slit, the second direction being orthogonal to the first direction.

6. The medium according to claim 1, wherein the at least two slits are two slits.

7. A medium to be mounted in and to be printed with a printer, the medium comprising:

a release material that is opaque;

a slit provided in the release material and having a square shape including a first side, a second side, a third side, and a fourth side, the first side and the second side opposing each other, the third side and the fourth side opposing each other; and a print label comprising:

a printing layer on which an image is formed, the printing layer having a square shape; and a base layer fixed to the release material so as to span across both the first side and the second side of the slit, the base layer being arranged between the release material and the printing layer in a layering direction, the base layer being transparent, wherein the base layer has a square shape including a fifth side, a sixth side, a seventh side, and an eighth side, the fifth side and the sixth side opposing each other, the seventh side and the eighth side opposing each other, wherein the seventh side and the eighth side of the base layer are parallel to respective ones of the third side and the fourth side of the slit and within proximity of respective ones of the third side and the fourth side of the slit, wherein the fifth side of the base layer is on a side closer to the first side of the slit than the second side of the slit, wherein the sixth side of the base layer is on a side closer to the second side of the slit than the first side of the slit, wherein a first distance is greater than a second distance, the first distance being a shortest distance between the first side of the slit and the fifth side of the base layer, the second distance being a shortest distance between the second side of the slit and the sixth side of the base layer, and wherein the whole of the square shape of the printing layer overlaps the square shape of the slit when viewed in the layering direction.

8. The medium according to claim 7, wherein the third side of the slit is offset toward the eighth side of the base layer rather than the seventh side of the base layer, and wherein the fourth side of the slit is offset toward the seventh side of the base layer rather than the eighth side of the base layer.

9. The medium according to claim 7, wherein the square shape of the printing layer includes a ninth side, a tenth side, an eleventh side, and a twelfth side, the ninth side and the tenth side opposing each other, the eleventh side and the twelfth side opposing each other, wherein the fifth side of the base layer is on a side closer to the ninth side of the printing layer than the tenth side of the printing layer, wherein the sixth side of the base layer is on a side closer to the tenth side of the printing layer than the the ninth side of the printing layer, wherein a third distance is greater than a fourth distance, the third distance being a shortest distance between the ninth side of the printing layer and the second side of the base layer, the fourth distance being a shortest distance between the tenth side of the printing layer and the sixth side of the base layer, and wherein a fifth distance is equal to or greater than the third distance and is equal to or smaller than three times the third distance, the fifth distance being a shortest distance between the ninth side of the printing layer and the tenth side of the printing layer.

10. The medium according to claim 7, wherein the printing layer has a shape and a size same as a shape and a size of an area enclosed by the slit.

11. The medium according to claim 7, wherein the printing layer has a size smaller than a size of an area enclosed by the slit.

12. The medium according to claim 7, further comprising:

a label fixed to the release material and connected to the seventh side and the eighth side of the base layer via perforations.

13. The medium according to claim 7, wherein the slit comprises a plurality of slits each of which is provided in the release material, wherein the print label comprises a plurality of print labels each of which is fixed to the release material corresponding to respective ones of the plurality of slits, wherein the release material is elongated in a first direction parallel to the third side of each of the plurality of slits, and wherein a plurality of sets of slits and print labels is juxtaposed in the first direction on the release material, each of the plurality of sets of slits and print labels including one of the plurality of slits and corresponding one of the plurality of print labels.

14. The medium according to claim 13, wherein the plurality of sets of slits and print labels are arranged adjacent to each other with no gaps therebetween.

15. The medium according to claim 7, wherein the medium has a roll shape, and is accommodated in a cassette to be detachably mounted in the printer.

16. A method of using the medium of claim 7 to wrap a label around a cable, the label having a front surface on which a printed image is formed and a back surface, the back surface including an adhesive layer on which the release material is fixed so that the adhesive layer is exposed, the release material having the square shape including the first side and the second side opposing each other, the adhesive layer having a first portion on a side of the first side of the release material and a second portion on a side of the second side of the release material, the first portion and the second portion being exposed, the method comprising:

encircling the cable with the label so that the release material is on an inside; and bonding the first portion of the adhesive layer and the second portion of the adhesive layer together while aligning the first side and the second side in an encircling direction.

17. The medium according to claim 7, wherein a third distance is equal to or greater than the first distance and is equal to or smaller than three times the first distance, the third distance being a shortest distance between the first side of the slit and the second side of the slit.

18. A medium to be mounted in and to be printed with a printer, the medium comprising:

a release material having a composition that includes at least one of paper, colored film, fabric, and metal;

a slit provided in the release material and having a square shape including a first side, a second side, a third side, and a fourth side, the first side and the second side opposing each other, the third side and the fourth side opposing each other; and a print label comprising:

a printing layer on which an image is formed, the printing layer having a square shape; and a base layer fixed to the release material so as to span across both the first side and the second side of the slit, the base layer being arranged between the release material and the printing layer in a layering direction, the base layer being transparent, wherein the base layer has a square shape including a fifth side, a sixth side, a seventh side, and an eighth side, the fifth side and the sixth side opposing each other, the seventh side and the eighth side opposing each other, wherein the seventh side and the eighth side of the base layer are parallel to respective ones of the third side and the fourth side of the slit and within proximity of respective ones of the third side and the fourth side of the slit, wherein the fifth side of the base layer is on a side closer to the first side of the slit than the second side of the slit, wherein the sixth side of the base layer is on a side closer to the second side of the slit than the first side of the slit, wherein a first distance is greater than a second distance, the first distance being a shortest distance between the first side of the slit and the fifth side of the base layer, the second distance being a shortest distance between the second side of the slit and the sixth side of the base layer, and wherein the whole of the square shape of the printing layer overlaps the square shape of the slit when viewed in the layering direction.

* * * * *